(12) United States Patent
Baker et al.

(10) Patent No.: US 12,741,830 B2
(45) Date of Patent: Sep. 22, 2026

(54) APPARATUS AND APPLICATIONS FOR MAGNETIC LEVITATION AND MOVEMENT USING OFFSET MAGNETIC ARRAYS

(71) Applicant: US Positronix Inc., Oberlin, OH (US)

(72) Inventors: John M. Baker, Hayward, CA (US); Remigio Perales, Oberlin, OH (US); Clifford J. P. Gilman, New Castle, NH (US)

(73) Assignees: SRI International, Menlo Park, CA (US); US Positronix Inc., Oberlin, OH (US)

( * ) Notice: Subject to any disclaimer, the term of this patent is extended or adjusted under 35 U.S.C. 154(b) by 616 days.

(21) Appl. No.: 18/257,287

(22) PCT Filed: Dec. 16, 2021

(86) PCT No.: PCT/US2021/072947
§ 371 (c)(1),
(2) Date: Jun. 13, 2023

(87) PCT Pub. No.: WO2022/133463
PCT Pub. Date: Jun. 23, 2022

(65) Prior Publication Data

US 2024/0043229 A1 Feb. 8, 2024

Related U.S. Application Data

(60) Provisional application No. 63/199,269, filed on Dec. 16, 2020.

(51) Int. Cl.
*B65G 54/02* (2006.01)

(52) U.S. Cl.
CPC .................................. *B65G 54/02* (2013.01)

(58) Field of Classification Search
CPC .......... B61B 13/00; B61B 13/08; B65G 54/02
See application file for complete search history.

(56) References Cited

FOREIGN PATENT DOCUMENTS

WO WO-2020136395 A1 * 7/2020 ........... A47C 21/044

* cited by examiner

*Primary Examiner* — Robert J McCarry, Jr.
(74) *Attorney, Agent, or Firm* — Kathryn Perales

(57) ABSTRACT

Repulsive force created by actuated permanent magnets is used to levitate and transport heavy loads. A bed of permanent magnets is selectively actuated to levitate an array of magnets positioned above the bed, such that the magnets in the levitated array are opposed to the actuated magnets, and of the same magnetic pole, thereby creating a repulsive force. The actuated magnets are vertically offset from magnets in the bed of permanent magnets that have not been raised, thereby imparting maximum levitation forces to the magnets in the levitated array. These systems can levitate and transport objects over level or sloped surfaces, in a straight path or along curves and corners. A bed of magnets can be attached to the floor, or to a set of moving decks that rearrange themselves in a desired path. Our systems can simulate walking or running, similar to a treadmill or virtual gaming platform.

24 Claims, 12 Drawing Sheets

2
4
3
2
4
3

32
32
32
30
34
33
31
31
31

32
32
30
30
33
32
34
31
31

32
32
33
30
30
34
31
31

APPARATUS AND APPLICATIONS FOR MAGNETIC LEVITATION AND MOVEMENT USING OFFSET MAGNETIC ARRAYS

BACKGROUND OF THE INVENTION

Examples of existing systems for lifting and transporting objects using magnetic repulsive force include maglev trains, planar movers, and the Hendo Hoverboard. All of these systems require the use of electromagnets in the system, and each has its disadvantages: maglev trains require huge amounts of power, planar movers can only move objects with little mass, and the Hendo Hoverboard generates a lot of heat.

Existing treadmills and moving sidewalks use belts, rather than magnets.

BRIEF DESCRIPTION OF THE INVENTION

The Inventors' provisional patent application 63/199,269 and PCT patent application PCT/US21/45457 describe a system of permanent magnets which can be used to levitate and move objects, and various configurations and applications.

The system uses a larger array of permanent magnets as a base, which in its simplest form levitates a smaller array of permanent magnets attached to the underside of an object, through the repulsive forces between the two arrays of magnets. Stability of the levitated object can be achieved through the use of rails along a path of base magnets.

Greater lift, versatility, lateral propulsion and stability can be achieved through adding actuators to the base magnets, and using the actuators to allow small arrays to be offset vertically above the rest of the base array magnets. The inventors surmise that the net repelling/lifting force of each smaller offset array is maximized because lifting the levitated array of magnets brings it up out of range of attractive forces of surrounding base array magnets. In addition to providing lift, actuation of base magnets in specific locations in relation to the levitated array magnets can push the levitated object in any lateral direction, and/or provide torque to the levitated object, causing it to move, stop, speed up, slow down, turn, tilt, and spin. The actuated base magnets can further cause small adjustments to achieve stability in the levitated object. Actuation of the levitated magnets can similarly induce levitation, lateral propulsion, rotations and stability.

Electromagnets can be added to work with or in place of the permanent magnets.

The amount of lateral spacing between magnets in each array affects the net lifting power of the system. In some embodiments, spacing of the levitated array of magnets is adjustable, either between jobs, or on the fly. For example, when the shape of the levitated array is an empty square or other empty shape, the magnets can be simply moved away from the center of the levitated object to increase spacing, and closer to the center to decrease spacing. In some embodiments, spacing of base array magnets will match spacing of levitated array magnets. In others, the spacing will not be the same.

While the geometry of the base array will usually be a regular rectangular grid, the geometry of the levitated array may be different, such as a checkerboard with gaps, or an X, or the perimeter of a square. The geometry of the levitated array can be changed easily when its magnets are actuated, bringing down only the magnets desired in the geometry. The levitated array magnets can also be laterally moveable, either between jobs or on the fly.

The base arrangement of magnets may be flat, level and planar, or it may be sloped and planar, or it may have topographical features such as hills and bowls, ridges and valleys.

A transport type of system has a large base array of actuated magnets, for example covering a shop floor, and likely includes a false floor above the base magnets. Each container or item of cargo has a levitated array of magnets on its underside, which is lifted and sometimes propelled and steered, above the false floor, by repulsive forces from the actuated base magnets underneath.

Instead of attaching many actuated magnets to a shop floor, a fleet of moving decks, each with an array of base magnets on top, can move around under the false floor. A deck moves to the appropriate spot to receive a container, sets itself in place, and actuates its magnets to transport the container across and above the deck. Another deck sets itself in an adjacent spot to receive the container as it travels off the edge of the first deck. This process continues with multiple decks until the container reaches its destination.

A treadmill type of system is smaller than a transport system, and usually will include a walking area, where a person steps on levitated platforms, as well as a return area, where levitated platforms travel when they are not in the walking area. There will usually be a first false floor between the actuated base magnets and the levitated platforms, to prevent a user from stepping on the base actuated magnets. There will also usually be a second false floor above the levitated platforms in the return area, to prevent a user from stepping on or being hit by the levitated platforms which are travelling to a new location, getting ready to re-enter the walking area.

In a treadmill system, the user does not actually go anywhere; the user stays roughly in one place, as compared with the frame of reference of the room. Each levitated platform moves opposite to the direction of the steps that the user is taking, so that there is roughly no net displacement of the user. A treadmill system may be level, or it may be permanently sloped. It may also be capable of changing between a level configuration and a sloped configuration.

This type of treadmill system can be omnidirectional, allowing a user to step forward, backward, and to either side. It can also use just one levitated platform instead of many, creating a balance board type of system where the user leans and surfs instead of stepping.

A moving sidewalk type of system has a similar configuration to the treadmill, except that the walking area is longer, and the system expects multiple users to step in the walking area at one time, and the users are continually transported in one direction. One configuration includes levitated platforms which cover the complete walking area at all times, moving forward with the users, and each platform circulates back around from the end of the walking area to the beginning via the return area, under a false floor. In this example, the user can stay still, or walk forwards or even backwards. Another configuration includes a subset of levitated platforms that stays with each user along the path of the walking area, with individual platforms circulating around the user from back to front, when the user is walking forward. Another configuration includes a subset of levitated platforms that stays with each user along the path of the walking area. In this system the user does not walk forward or backward, while allowing the levitated panel to transport the user from beginning to end.

DETAILED DESCRIPTION OF THE INVENTION

Figure 1:
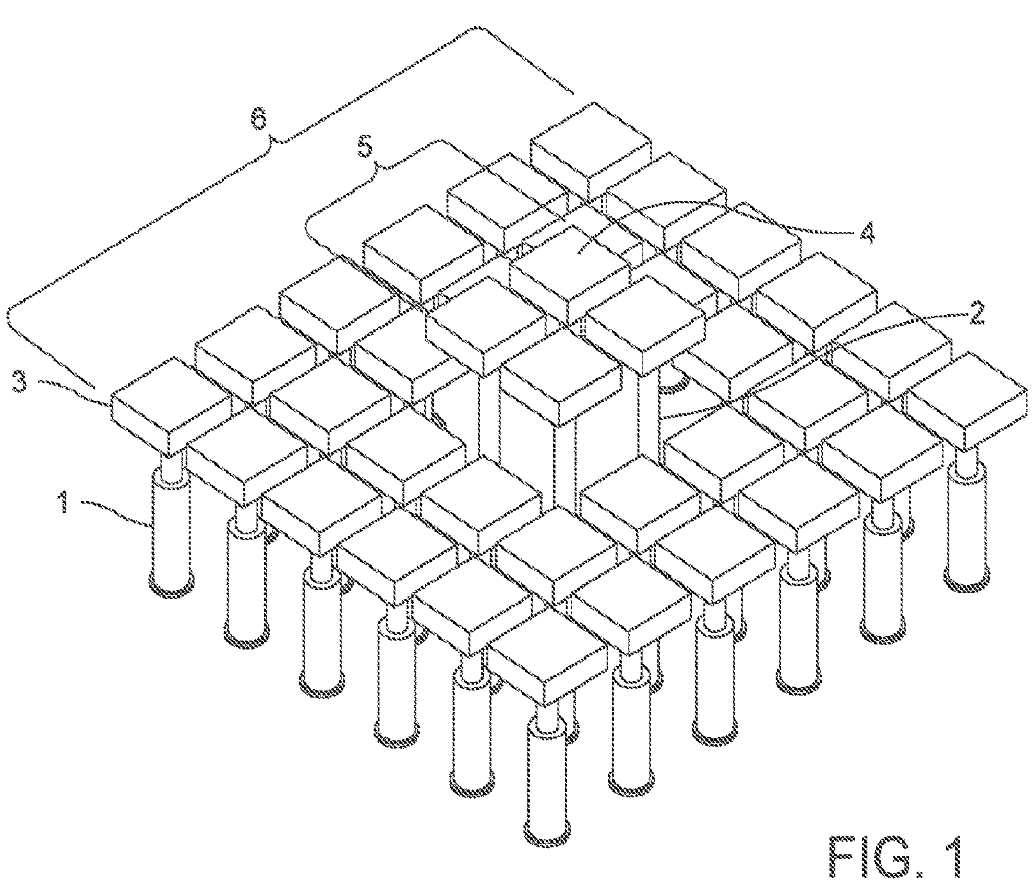
FIG. 1 is an isometric view of a bed of actuated magnets, with a 2×2 subarray of actuated magnets shown offset above the rest of the bed.

The systems described in this disclosure overcome each of the three problems to realize a system of levitation capable of supporting weights up to a few hundred pounds or more on a levitated platform with lateral dimensions of up to several feet or greater.

Problem 1: Earnshaw's Theorem

In 1842 the British mathematician Samuel Earnshaw demonstrated a mathematical proof showing that it is not possible to stably levitate a collection of point charges in equilibrium solely by the electrostatic interaction of the charges. This implies that any configuration of magnets in a levitation application must be dynamically controlled. In many applications this dynamic control is achieved using electromagnets (e.g. levitated globes). For instance, a permanent magnet can be levitated over an array of electromagnetic coils which is tied to a feedback servo. The feedback is such that the currents in the electromagnet are adjusted dynamically to ensure that the permanent magnet remains in a stable stationary position. Since this method uses active feedback, it is not a violation of Earnshaw's theorem.

However, this arrangement is not well suited to levitation of objects weighing several hundred pounds given the power requirements. We estimate that such a system would require greater than 10 kW to support a one square foot area weighing 300 pounds. To overcome this power requirement, this invention uses permanent magnets to provide the levitation force. To make the levitation stable, the magnets are dynamically controlled in the vertical direction. As an example of dynamically controlled levitation using only permanent magnets, arrange two magnets of equal size such that one magnet is fixed and the other levitates above it at a certain distance. So long as like poles of the two magnets are facing each other, it will make no difference as to whether South faces South, or North faces North. Four smaller magnets are attached to linear servos on each lateral side of the levitated magnet. As the servo is moved up and down, it creates a horizontal force which repels the magnet horizontally. By tying the servo to a position-sensing feedback system, the levitated magnet is held in a stable position. Since the levitation force is provided by the permanent magnets, this system uses little power as compared to a system which uses an electromagnet to provide the levitation force. The only power consumed is in providing the active feedback.

Problem 2: Poor Scaling

There is a limit to how much weight can be supported in a levitation application for a given magnet size. In general, to levitate more weight requires more magnetic material. However, for a given magnet thickness, the levitation force per unit area does not scale with surface area as the magnet is made larger in the lateral dimensions. To demonstrate this lack of scaling, we simulated two N52 Neodymium magnets each 0.25 inches thick and separated by a levitation gap. We varied the levitation gap and the lateral size of the magnets, while keeping the thickness fixed. The results show that the force per unit area decreases as the width of the magnets increases.

For an application where a large amount of weight (hundreds of pounds) must be levitated on a large platform (feet scale in lateral dimensions,) this lack of scaling is a problem. If the solid magnetic plates are replaced by an array of smaller submagnets with spacing in between each submagnet, the lift force is increased significantly. When comparing the amount of weight that can be levitated by a 1 ft square solid plate N52 Neodymium magnet as opposed to a 1 ft×1 ft array of 0.25 in thick N52 Neodymium magnets with ⅛ inch spacing between the magnets, at a levitation gap of 0.5 cm, the lifting force of the array is 50% more than that of the solid plate. In this disclosure, we utilize arrays of spaced magnets in the levitation scheme to increase the levitation force.

Problem 3: Small Magnet Over Larger Magnet

It seems logical and practical to try to levitate a relatively small magnet array over a much larger array. We discovered, however, that the levitation force on a magnetic platform of constant size decreases as the size of the base array of magnets is increased. Our simulation and testing consistently show that as the lateral size of a base array of magnets increases, the levitation force per unit area imparted to a levitated magnetic array of fixed size decreases.

We simulated and experimented with lifting and offsetting the subarray of magnets directly under a levitated array of magnets, from the main base array. We found that as the offset distance (vertical distance between base magnets which remain at the base level and base magnets which have been offset and lifted up) increases, the levitation force also increases, to a point.

We simulated and tested three scenarios: 1) No Offset—the base array is a 10×10 array of magnets and all the magnets in the base array are in the same plane. 2) With Offset—the base array is a 10×10 array of magnets but the 2×2 set of magnets located directly under the levitated magnets are offset vertically above the rest of the 10×10 plane by 4 cm. 3) Small Base Array—the base array of magnets has the same size and spacing as the 2×2 magnet levitated array.

Test data closely tracked our calculated simulations. We found that when a small 2×2 array is levitated over a larger 10×10 array (No Offset group,) relatively little levitation force is provided as compared to the case when both levitated and base arrays were the same size (Small Base Array group.) However, when a subgroup of the magnets in the larger 10×10 array directly underneath the levitated array is offset vertically above the rest of the 10×10 array by 4 cm (With Offset group,) the levitation force is restored to the level of the Small Base Array group.

To provide context, in the No Offset test, the lower 10×10 array could not lift or levitate the levitated array structure, weighing about 6 pounds, at all. Both the With Offset and Small Base Array tests were able to levitate over 20 pounds. This concept of using an offset magnet subarray to increase the levitation forces from a large base array is central to this invention.

We believe that this phenomenon is due to attractive forces between the levitated array magnets and those base magnets which are not directly under the levitated array magnets. We observe the maximum lift force of a given offset subarray to be reached when the offset subarray is far enough away from any other base magnets. We have found that when using magnets which are between ¼ inch and 2 inches thick, then an offset magnet subarray reaches its maximum amount of lift provided to a levitated array when the offset subarray is raised 4 centimeters above the rest of the base array. We found that, for these magnet thicknesses, and with a target levitation gap of 0.25 cm (the gap between the offset subarray magnets and magnets in the levitated array) in order for the offset subarray to provide at least 50% of its maximum lift force to the levitated array, the offset should be at least 0.25 centimeters, which along with 0.25 cm levitation gap creates a target gap of 0.5 cm between the levitated array and the base magnets not levitated, thereby sufficiently escaping attractive interactions with the base magnets to allow a lift force that is 50% of its maximum.

We next describe a simplified no-offset embodiment of a transport system for cargo (cargo herein meaning a mass or quantity of something taken up and carried, conveyed or transported, as defined by Merriam Webster), which overcomes the problems of Earnshaw's Theorem, poor scaling and small magnet over large magnet. A 2×2 magnet array is levitated over a long chain of fixed permanent magnets. This configuration could be useful in applications where lateral motion in only one dimension is needed. Simulations show that, similar to the case of a small array over a large square array, the force per unit area decreases as the base array is made large (longer in this case). However, the falloff with increased length in one dimension is less severe than in the case where the base array grows in both length and width.

This no-offset embodiment includes a long narrow permanent magnet array arranged as a level path, for example 2 magnets across and 100 magnets long, which are all attached to the floor. All of the magnets in the base array are of the same size (for example 1 inch square and ¼ inch thick) and strength (for example N52 neodymium.) The top and bottom surfaces of each magnet are square shaped, and the height of each magnet is small. Each magnet is spaced ⅛ or ¼ inch away from its nearest neighbors. Each magnet in the base path array has a polarity pointing in the same direction up. Physical rails stand parallel to the base path, on both sides of the base path, equidistant from the center of the base path (assuming the cargo's center of gravity is in the physical center of the cargo.) The height of the rails and distance between the rails are chosen according to the size and shape of the intended cargo to be moved along the path. The purpose of the rails is to keep the cargo and cargo container from slipping off the path on either side. The rails are physical restraints which help overcome the instability described in Earnshaw's theorem.

In this simplest no-offset embodiment, only one size of cargo or cargo container is used with the transport system. A cargo container has an array of magnets attached to the underside of the cargo container with all of its magnets having a polarity pointing down with the same polarity as the base array magnets point up, such that the upper levitated array repels the lower path array. The levitated array is centered on the underside of the cargo container, for balance and stability.

When the cargo container is placed above the path array, the cargo container levitates due to the repulsion between the levitated and base path magnet arrays. The rails prevent the cargo container from moving from side to side, so that the levitated array is always precisely above some portion of the base path array. A user can push the cargo container from behind, or pull from the front, walking over the base path array, causing the cargo container to easily move along the path between the rails.

This simplest no-offset embodiment takes advantage of the increased levitation force of a narrow base array, which is limited in one horizontal dimension, as opposed to a large base array, which is not limited in either dimension. As shown in our research, a lower planar array with large width and length relative to the levitated array does not provide much, if any, overall levitation force. Simulation suggests that this is due to the attractive forces between each levitated magnet and adjacent magnets in the base array. The interaction between a lower magnet and a levitated magnet that is directly above is purely repulsive. However, when a levitated magnet is laterally displaced between 82% and 100% of its width from a lower magnet, the interaction becomes attractive (exact numbers for this transition depend upon the thickness of each magnet.)

If we consider a single levitated magnet over a two dimensional array of lower magnets, we can use the single magnet simulations to predict the net force on the levitated magnet. Considering the 3×3 planar array of lower magnets underneath and closest to the levitated magnet, one base array magnet is strongly repelling while 8 nearest neighbors below and around the levitated magnet are attracting. By contrast, a linear array has fewer attractive nearest neighbors. For example, a single levitated magnet over a 1 magnet wide base array has only two attractive nearest neighbors in the base array.

Limiting one dimension of the base array, as in the no-offset embodiment for cargo transport, allows the base path array to exhibit a substantial amount of levitation force per unit area, although it still has a smaller levitation force per unit area than a series of small actuated offset subarrays would exhibit on an upper levitated array.

A cargo container (with or without cargo) could also traverse the base path without human intervention. Any means of propelling the levitated cargo container along the path from origin to destination is incorporated as part of this invention, including mechanical (such as single or multiple wheels, or arms in constant or temporary contact with the base array top surface or rails), forced air such as with an onboard fan, compressed air or pressurized gas emission, atmospheric airflow imparting force to onboard sails, or a small robot "tug" either pushing or pulling the levitated cargo. These "tug" robots could also attach to the cargo containers on one or more sides to provide stabilizing forces, in addition to forces to impart motion.

The individual magnets in the levitated and base arrays may be a different size or shape than that described in the simple no-offset embodiment, for example the shape of the top- or bottom-facing side of each individual magnet may be square or rectangular (as in a rectangular prism), or circular (as in a cylinder), or some other shape. Each individual magnet may be a sphere. The magnets may be arranged in a regular pattern which is not exactly the same as the described square, rectangular or linear arrays. The magnets in the levitated array may or may not be exactly the same in size or strength as those in the base array, and may or may not have the same lateral spacing between magnets. In this case, force curves for any particular magnet size may be calculated and used to predict the forces and find an optimal arrangement that provides maximum levitation. The size and shape of the cargo container may vary, so long as its lateral movement is constrained between the rails, and its load can be distributed so that it properly balances while supported by the repulsive magnetic force applied to the magnetic array attached to the cargo container's underside.

The no-offset embodiments can be made dramatically more powerful, and able to lift heavier loads, by adding linear actuators (shown in FIGS. 1, 2 and 3 as 1 and 2) to the magnets (3, 4) in the path, which raise and lower the magnets (3, 4) individually. As the user pushes the load along the path, actuated magnets from the base path, underneath the levitated array attached to the underside of the cargo container, raise up to support the load. The linear actuators are dynamically adjusted so that a subset of the magnets from the base path are raised or offset a sufficient height, so that both the raised offset array (5) and the levitated array escape the attractive forces of the remainder of the magnets in the bed (6). The linear actuators on the underlying magnets can be controlled based on one or more of user input, sensors on the path, sensors on the cargo container, video monitoring, communication between the path and the cargo container, and other methods. In this implementation, a non-magnetic floor (i.e. false floor) may be installed, just above the highest intended position of the actuated magnets (4), to prevent the user from stepping directly on the moving magnets and sensors, and damaging them, or tripping. Other methods of preventing the user (or other machines or objects) from stepping directly on or making contact with the magnets in the path may be developed.

Figure 10:
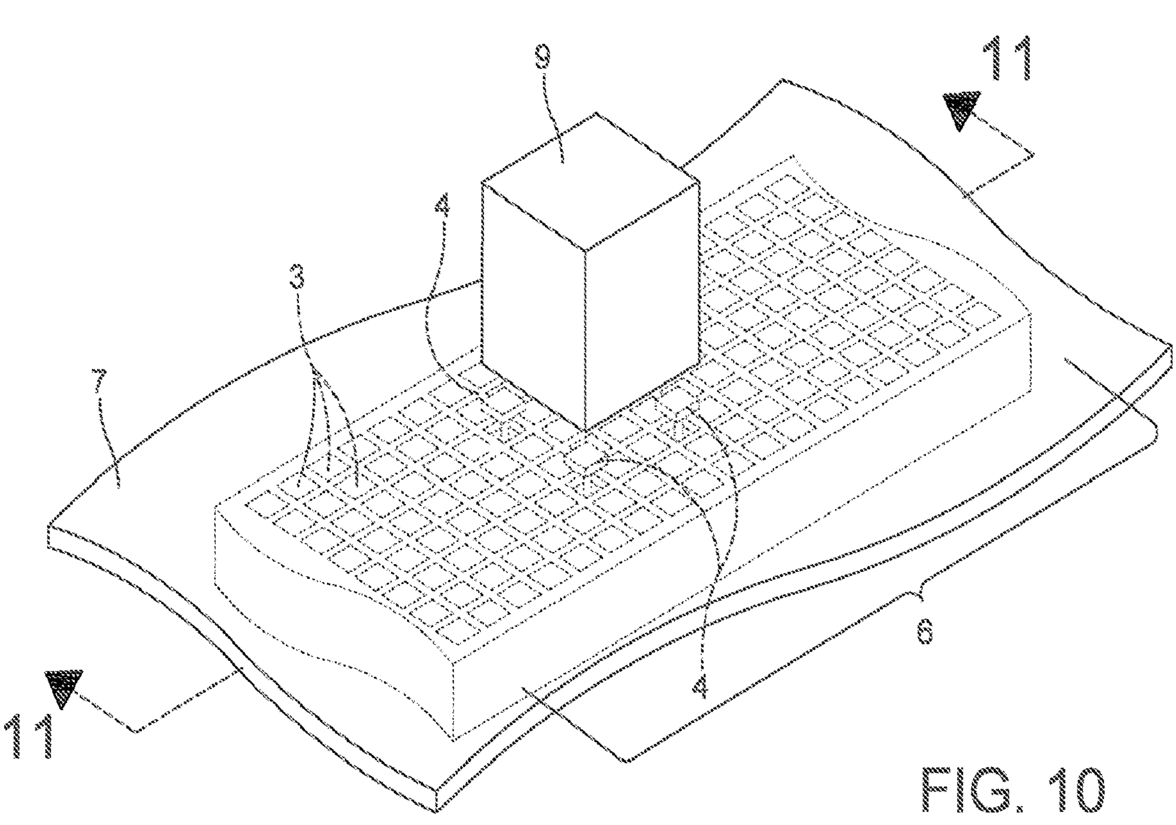
FIG. 10 shows a transport system wherein underlying actuated magnets raise up from a bed of magnets to support and stabilize a cargo container as it moves across the plane in any direction. A false floor is situated between the bed of magnets and the cargo container.
Figure 11:
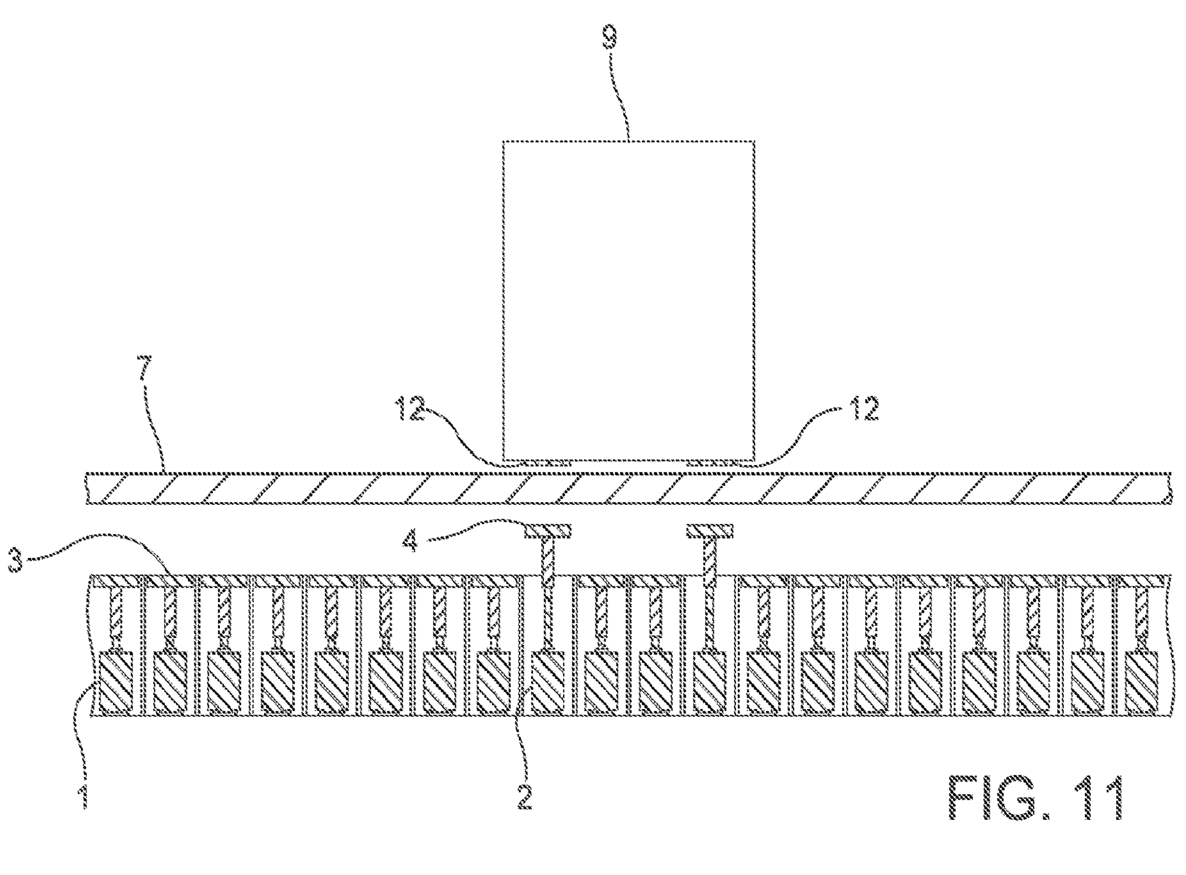
FIG. 11 is a sectional view from the side of FIG. 10, showing the bed of magnets with some magnets actuated, the false floor, and the levitated cargo container with an air gap between the cargo container and the false floor.
Figure 12:
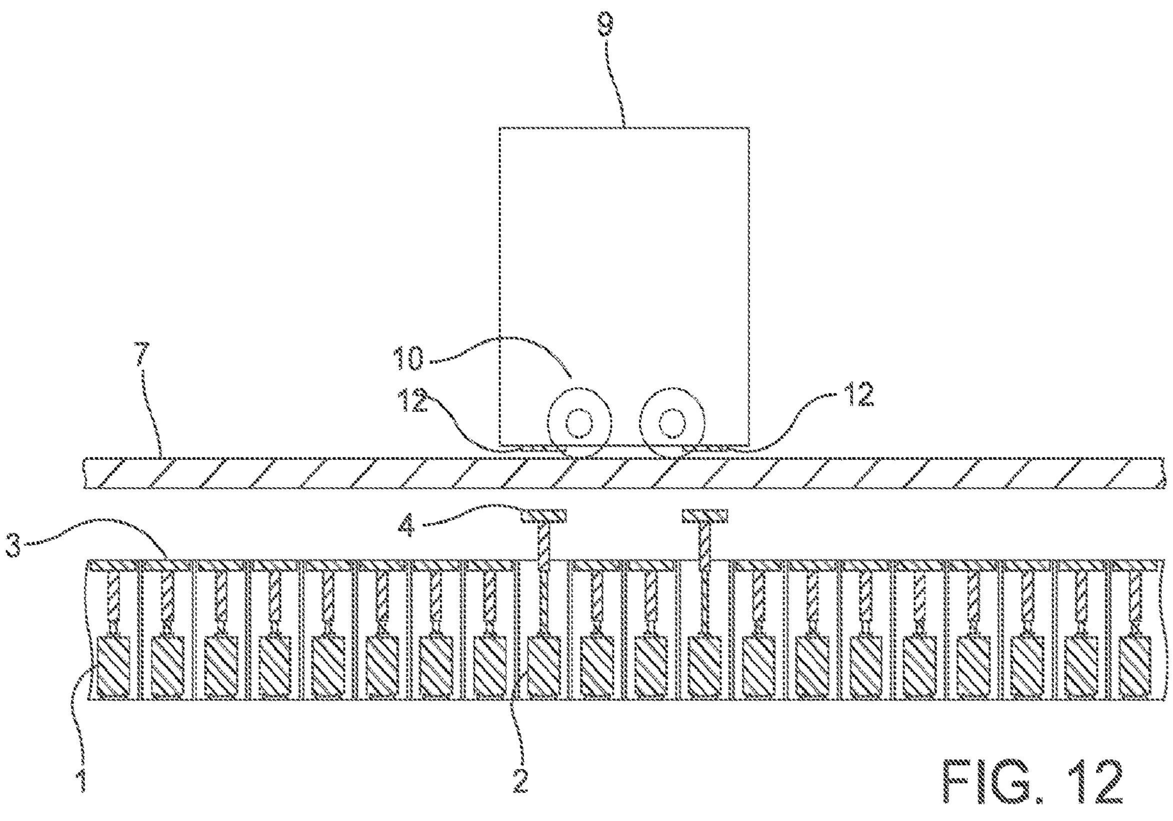
FIG. 12 is a sectional view from the side of a system similar to FIGS. 10 and 11, with the addition of wheels to support the cargo container.

When a false floor is used, as shown in FIGS. 10, 11 and 12 as item 7, the levitation forces from offset subarrays (shown as item 5 in FIG. 1) can be used to lift levitated objects (shown as item 8 in FIGS. 2 and 3 and item 9 in FIGS. 10, 11 and 12) just enough so that they can slide or roll easily across the false floor. A low friction interface between the floor (7) and the levitated object (9) is indicated—such as a slippery floor, or ball bearings or skate blades attached underneath the levitated object, or casters or wheels (10) as shown in FIG. 12. This reduction of friction, short of actual levitation with an air gap between the levitated object (9) and the floor (7), may provide enough value for some applications, where actual floating levitation may not be necessary. For some applications, the combination of a low friction interface and horizontal forces imparted from offset subarrays to levitated arrays on an object will be enough to move the object across the floor. Stability in this case is provided by the floor, so that power can be reserved for pushing, redirecting and steering the object.

Although many varieties of linear actuators are available, generally the types can be separated into four categories: electro-mechanical, hydraulic, pneumatic, and piezoelectric. While actuators in each of these categories have benefits, the choice of linear actuators must be determined by attributes including, but not limited to, range of motion, speed, accuracy, strength, size, self-containment, maintenance level, and cost efficiency. The actuators must have a large enough range of motion to exert the necessary forces and torques on the levitated array for a particular application. For instance, in an application where lift forces are critical, we found 4 cm to be a good minimum displacement. In a different application, where speed is more critical, a smaller actuation range could be ideal. We have found that in exemplary configurations, 0.25 cm actuated lift allows an offset array to provide 50% of its maximum repulsion lift force to a levitated array at a levitation gap of 0.25 cm. Therefore, a reasonable minimum range of motion for an actuator is 0.25 cm for many applications. Actuation speed must be high enough to be able to adjust with respect to real-time active feedback. The actuators' adjustment must have continuous precision along the range of actuation. The actuators must be small enough to satisfy the size constraints of the application, and self-contained to maintain a simplicity to the mechanism of actuation. Additionally, maintenance level and cost efficiency are to be considered. We have found that micro electro-mechanical linear actuators best satisfy the above constraints. For a running treadmill application, we expect an actuation distance of 4 cm over a 300 ms time span (requiring speeds of 13 cm/s).

Actuators used to move magnets to an offset position may take a myriad of forms, including those shown in FIGS. 1-5 as (1 and 2), which move in a telescoping fashion. Other embodiments of actuators include but are not limited to a spiral track, where twisting the actuator one way causes the magnet to rise, and twisting the other way causes the magnet to lower; and a rotating disk or cylinder with a horizontal axis and a magnet mounted on the curved face, such that the magnet is in the offset position when the cylinder rotates the magnet to the highest point.

The lifting of the offset magnets can be accomplished in any number of ways, and the description of the use of a linear actuator is not meant to limit the invention to just the use of linear actuators to lift the offset magnets. As further examples, the offset magnets can be lifted by electromagnets, constructed such that beneath the base array of magnets exists an array of electromagnets. To isolate the effect of the electromagnet on the base array magnet, rather than the electromagnet acting directly on the base array magnet to raise it to the offset position, it instead acts on a second magnet attached to the base array magnet, and positioned between the electromagnet and the base array magnet. Each of the magnets within the base array is attached to another magnet that is between the magnet and the lower electromagnet, creating a 2-magnet vertical system. As the electromagnet is turned on, it repels the 2-magnet system upward, in an actuating motion. The raised 2-magnet system becomes part of the offset array, and is locked in place, as by for example a mechanical gear. The mechanical gear is then used to dynamically adjust the offset magnet's vertical height as needed. A similar approach can be accomplished by a push/pull solenoid system, such that the base array magnet can be positioned at the top of each solenoid, and when the solenoid is activated, the base array magnet is moved into the offset array. More generally, the offset magnets may be lifted by any means, so long as the offset magnets are raised, and can then be dynamically adjusted in offset height above the base array, to enable control and movement of the levitated array.

Linear actuators require power to move upwards. When the actuator must lift extra mass, more power is needed. However, once an actuator has reached a given position, it can stay in that position indefinitely without requiring any more power. A set of lifted magnets could provide repulsive magnetic force continuously on a load, without using any power at all. This feature makes a huge difference as compared with using electromagnets for lift, which must continuously use power to create any magnetic field.

Power Comparison: There are two scenarios with which we can compare the power needed for levitation of the offset permanent magnet based actuated system and the traditional electromagnetically based system: static loads and dynamic loads. In the static load case, the offset permanent magnet based actuated system (neglecting the power needed for active feedback) requires no power. By contrast, the electromagnetic based system requires that power be constantly supplied to the coils in order to generate a magnetic field to levitate a static load.

We have described four concepts:

1) Dynamically adjusting the vertical position of magnets (e.g. with linear actuators) in an active feedback scheme to overcome Earnshaw's theorem for stable magnetic levitation.
2) The use of an array of relatively thin magnets with spacing between them for increased levitation force as compared to a solid magnetic plate.
3) Levitation of a small magnetic array over a large array of magnets in which some of the magnets in the large array are offset vertically.
4) The ability to move the levitated array laterally across the large base array by dynamically raising and lowering the subset magnets individually into a series of offset arrays.

In the no-offset path embodiments already described, stability of the load has been provided by the use of rails on both sides of the path. The rails and the path limit where the loads can originate and end up, and non-adjustable rails limit the size and shape of the cargo which can be transported. One way to increase versatility of the system is to use the same idea of raising small offset arrays, but with a larger planar lower bed of magnets, covering a larger portion of the footprint of a warehouse floor, for example, where length and width of the base array is not as limited. Rails would not be compatible with such an implementation, except perhaps on the edges, to make absolutely sure a load doesn't fall off the edge.

Figure 2:
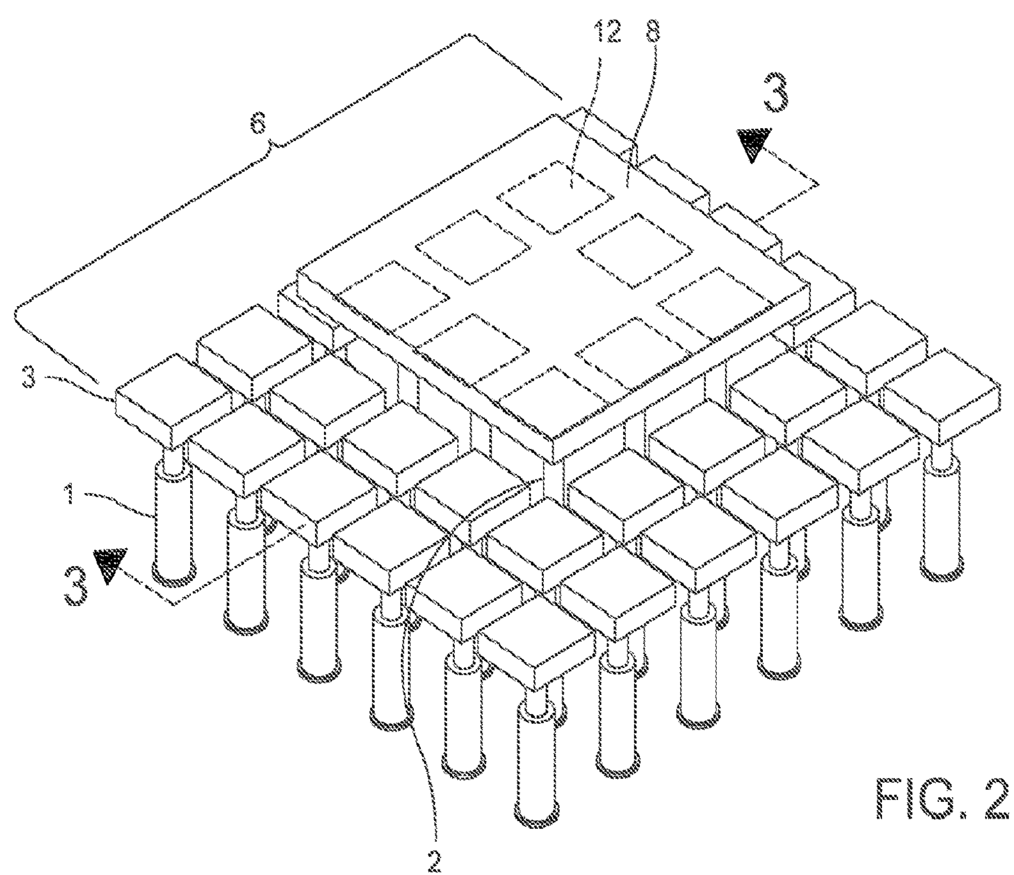
FIG. 2 is an isometric view of the same bed of actuated magnets shown in FIG. 1, with a 3×3 subarray of actuated magnets minus the center magnet shown offset above the rest of the bed, levitating a platform which has a matching array of magnets attached to its underside.
Figure 3:
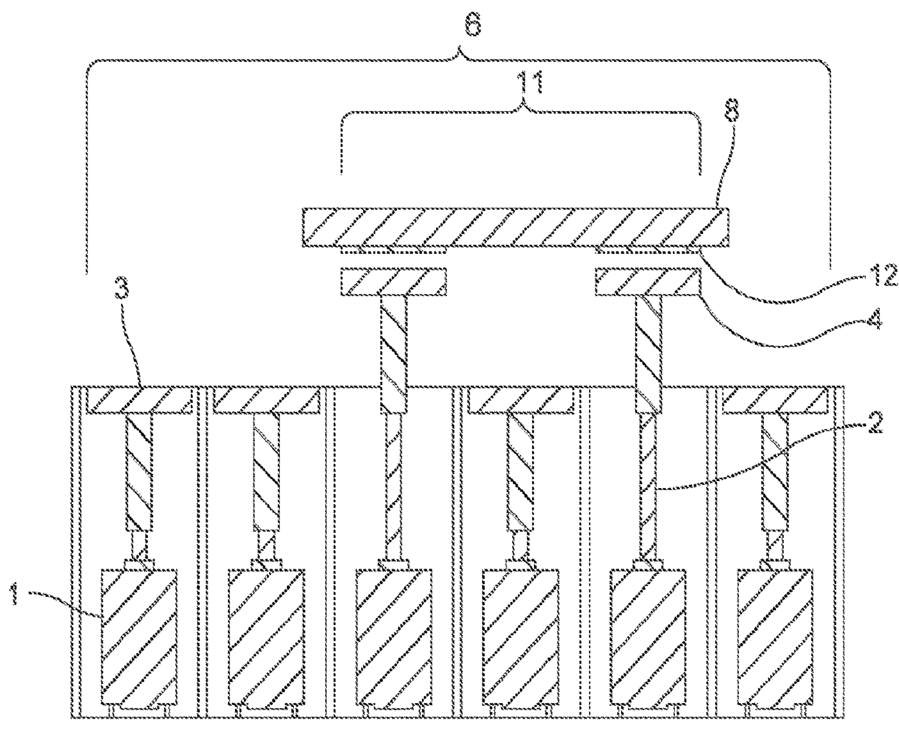
FIG. 3 is a sectional view from the side of FIG. 2, showing the bed of magnets with some magnets actuated, and the levitated platform with magnets attached underneath.
Figure 4:
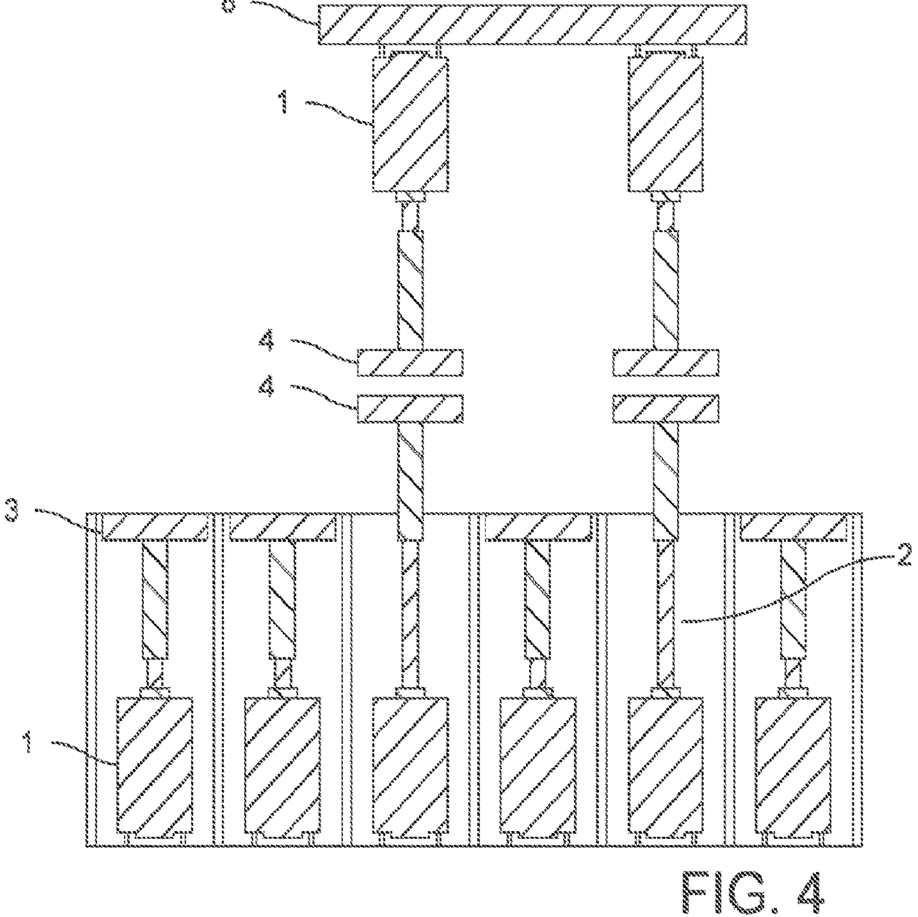
FIG. 4 is a sectional view from the side of a system similar to FIGS. 2 and 3, with the addition of actuators for the levitated magnets on the levitated platform.
Figure 5:
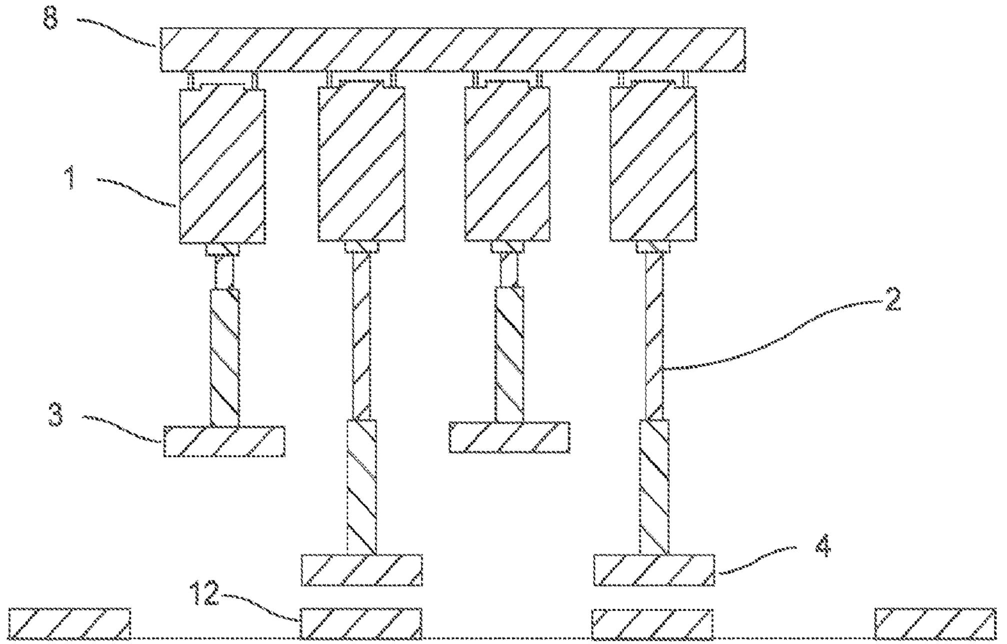
FIG. 5 is a sectional view from the side of a bed of permanent stationary magnets, with a levitated platform that has actuated magnets attached underneath.

We combine these elements to realize a system concept as shown in FIGS. 1, 2 and 3. The figures shows a bed (6) of permanent magnets (3, 4) connected to linear actuators (1, 2) which move up and down vertically. Above the bed (6) of actuated magnets (3, 4) is another smaller magnetically levitated array (11) of magnets (12) which is attached to a levitated object or platform (8) (shown in FIGS. 2 and 3, not in FIG. 1.) By selectively moving the actuated magnets (3, 4) up and down in subarrays (5) sized similarly to the levitated array (11), an offset subarray (5) is maintained directly underneath the levitated array (11) as much as possible, and this actuation can serve both to stabilize the levitation and to move the levitated array (11) and object/platform (8, 9) laterally.

In an exemplary embodiment, all magnets used are 1×1 inch square, ¼ inch thick N52 neodymium magnets, spaced ¼ inch apart. The bed consists of a 10×10 square matrix of these magnets, each of which is connected to a vertical actuator that can lift each individual magnet 4 cm above the plane of the lowest array, and each of which is oriented with N facing up. The levitated array consists of a 2×2 square matrix of these magnets (12), permanently attached to a platform or object, with all magnets oriented with N facing down towards the lowest array.

In a demonstration of this embodiment, the repulsive force generated by the permanent magnets lifted 20-25 pounds 1 cm, and lifted 5 pounds almost 3 cm.

Many variants to this example embodiment would provide enough levitation to lift a person. Each levitated array or arrangement of magnets may be in a rectangular or square pattern, or a hexagonal pattern, or a pattern of segments of concentric circles, or another regular pattern where the magnets may be spaced regularly. The array may be full of magnets, or some of the center or inner magnets may be removed.

Figure 6:
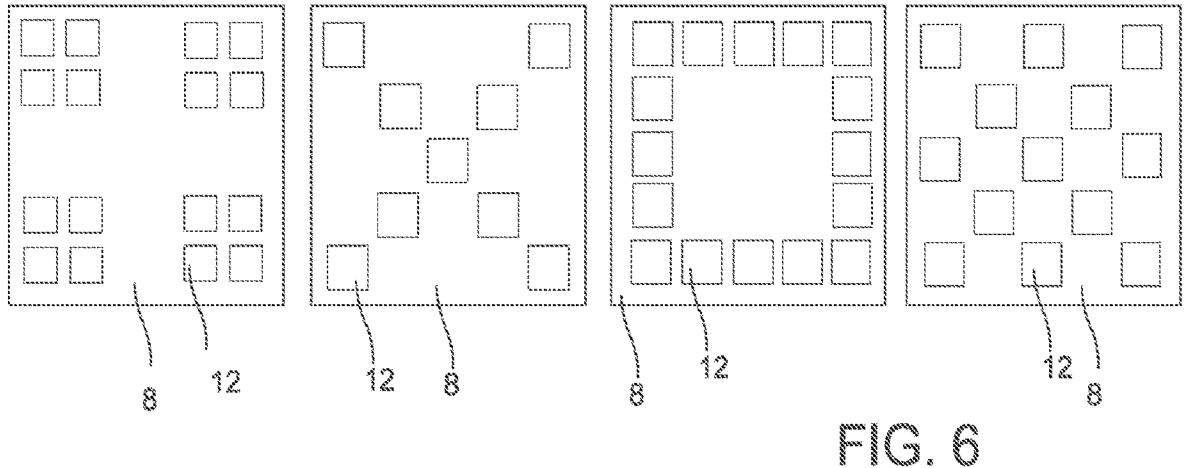
FIG. 6 shows several examples of arrangements of magnets which work well as levitated arrays, and which may be attached to the underside of a levitated object.

We have found through experimentation and simulation that the offset and levitated arrays do not need to be filled; instead, magnets can be removed from the center area of the levitated array, and not lifted for the offset array. A center-removed type of configuration as shown in FIGS. 2 and 6 provides a comparable amount of lift as when using a completely filled type of configuration, probably at least partly because the levitated array has fewer magnets and therefore less mass. This array configuration opens up possibilities of systems using fewer magnets in the levitated array than a full array, with lower cost and lighter weight, while having nearly the same amount of lift force.

Ideally, the magnets in the levitated array will be separated such that there is some amount of space between magnets. The amount of space between magnets affects the maximum amount of weight the system can levitate, and our simulations suggest that maximum levitation weight per unit area is achieved when the spacing between magnets is less than the magnet width. The simplest embodiment includes a square matrix of square magnets, where there is a small space between every magnet and its neighbors. Alternatively, a corner of a square magnet may touch the corner or the side of another square magnet, since such a configuration leaves plenty of space around each magnet. Similarly, cylindrical and spherical magnets may touch each other, since even the most tightly packed configuration of circles only contact each other at several points on each circumference, and sufficient empty space remains around each individual magnet. Hexagonal magnets configured in a hexagonal array can pack too tightly, and so like a square matrix, would need a small space on every side between each magnet and its neighbors, with no magnets touching each other to achieve maximum levitation force. Magnets in the levitated array may be far apart from each other.

The actuated magnets in the bed can be very close together so long as they don't interfere with each others' actuation. Similar to the levitated magnets however, there is a tradeoff between the density of the platform magnets and the amount of weight that can be levitated. More space can be added between the actuated magnets to lower the overall system cost at the expense of maximum levitation weight capability.

In another embodiment, multiple 2×2 arrays (square matrices) of magnets are mounted to the underside of a non-magnetic platform. The 2×2 arrays are not adjacent to each other, so that as an example, the width of one array separates each of the mounted 2×2 arrays. This platform, with multiple 2×2 arrays mounted to it, now rests over a base array of magnets. At every spot where a 2×2 array is located on the platform, magnets are raised from the base array such that an offset array exists underneath each 2×2 array, with each offset array contributing to the levitation force applied to the platform. We have found that this amount of spacing between the arrays is far enough to avoid undesired interactions, and provides enough room to allow for lateral control techniques for each of the levitated arrays.

The minimum or optimum offset gap, which is the vertical distance between the base array (6) of magnets (3, 4) and an offset subarray (5) of magnets (1, 2) which has been raised above the base array, such that sufficient, desired or optimum repulsive forces are created between the offset subarray and a levitated array (11), will vary. A minimum distance is necessary for the levitated array to escape the attractive influence of magnets in the larger base array. Variations in this minimum distance will depend on the size and strength of magnets in each array; desired lifting force; desired levitation gap; the size of the offset and levitated arrays, and other factors. However, we have found that regardless of size and shape, a minimum of 0.25 cm offset between base array and offset subarray with a levitation gap of 0.25 cm between offset subarray and levitated array is needed to reduce the attractive forces of the base array on the levitated array by 50%.

Desired levitation gap, which is the vertical distance between the offset subarray (5) of magnets (3, 4) and the levitated array (11) of magnets (12), will vary based upon details of the application and amount desired to be lifted. Keep in mind that as levitation gap decreases, repulsive/lifting force increases. This can be useful, for example, when an object falls onto a levitated platform—the greater force of the object's impact pushes the levitated platform closer to the offset array, decreasing the levitation gap, but at the same time the lifting force increases, so the offset subarray and levitated array are less likely to collide. If the application of the technology includes a physical barrier between the offset subarray and the levitated array, then there would be a minimum levitation gap needed.

We studied the effect of magnet thickness on the weight that can be levitated as a function of levitation gap, and found that doubling the thickness of both the lifting (lower) magnet and the levitated (upper) magnet roughly doubles the levitation force, while doubling the thickness of just one of the magnets results in an approximately 50% increase in levitation force. This allows for a tradeoff between levitation force and system size and weight in a given application. This also allows for a larger levitation gap which lifts the same amount of weight.

The optimal array design, minimizing system cost and levitated platform weight, will depend on a multitude of application design goals and objectives. Variables to optimize may include offset gap and levitation gap, as previously discussed, as well as thickness, size and shape of magnets used in each array, size of arrays, spacing between magnets in each array, full array versus magnets removed from the center of an array versus other optimized shapes (examples shown in FIG. 6,) and placement of levitated arrays within the application.

Lateral Movements: To levitate a motionless load, a set (5) of magnets underneath the levitated array attached to the underside of the load must be lifted sufficiently high above the rest of the lower bed (6) of magnets so that the levitated array (11) escapes the interference and attractive forces of the lowest, large bed of magnets. In an exemplary embodiment using N52 magnets which are ¼ inch thick, and 1 inch square, a vertical offset levitation gap of 4 centimeters was found to be sufficient to achieve maximum lift. If the load moves, then actuated magnets from the lower bed must raise themselves so as to create an appropriately sized offset subarray located as precisely underneath the load's array as possible. Actuated magnets which are already raised up, but no longer precisely underneath the load's levitated array, must lower back down to the lower bed level. As the levitated platform (8) continues to move, different sections of the lower bed array are raised and lowered so that the offset subarray is always directly (as much as possible) underneath the levitated array.

In addition to providing the force needed for levitation, the ability to raise and lower different sections of the bed of magnets also provides a means of generating the horizontal forces needed to cause these lateral movements. By raising and lowering magnets near the edge of the levitated array, a horizontal force is created. Consider a 2×2 magnet array levitated over another 2×2 array. An additional set of two magnets is offset near the edge of the lower magnet array. As the additional two offset magnets are brought higher, a horizontal force is generated on the levitated magnets which will cause the levitated magnets to move away laterally. By adjusting the height of the additional two magnets, the horizontal force on the levitated array can be adjusted. Not much force is needed to move the levitated array, since there is no friction to overcome except air resistance. In another embodiment, magnets are lowered and raised near the edge of the levitated array, from the levitated array platform itself. Similar to raising and lowering magnets near the edge from the base array, interactions between the upper and lower magnets create a horizontal force, which can cause lateral motion of the levitated array.

In another example, to cause a load to move to the right, one or more of the actuated magnets located just to the left of the current position of the load, and/or the leftmost actuated magnets currently supporting the load, move up a short distance. This force, combined with gravity and the absence of friction, effectively provides a nudge to the right. Another method to cause a load to move to the right involves one or more of the actuated magnets located just to the right of the current position of the load, and/or the rightmost actuated magnets currently supporting the load, to move down a short distance. This change in force acting on the load allows gravity, combined with the absence of friction, to tug the load to the right. Both of these methods can be used, or just one. At the same time, or a split second after the nudge and/or tug, actuated magnets to the right of the load must raise up to support the moving load.

By dynamically adjusting the actuated magnets in and around the offset array, the system can nudge the levitated array with enough horizontal force to cause the levitated array to move, speed up, slow down, rotate, change direction, and stop. When performing these functions, the lower magnets are additionally providing levitational force. A combination of these forces may cause the levitated array to tilt. The base array of actuating magnets may also serve to provide adaptive control, helping to stabilize the levitated array, by increasing and decreasing their height, thereby keeping the levitated platform stable.

Each offset magnet causes significant vertical and horizontal forces to act on levitated magnets above, the exact forces depending upon the levitated magnet's location relative to the lower offset magnet. By calculating and graphing force curves, we can perform a constrained optimization to determine actuator displacements needed to levitate a load and provide desired horizontal forces.

One set of actuations provides a constant levitation force as a small levitated array moves across a base array. Another set of actuations serves to both levitate a load and apply a fixed horizontal force to move a small levitated array across-the lower large array. Actuations can also use active feedback to stabilize the levitation. In an active feedback scheme, one or more position sensors are used to determine if the levitated platforms deviate from a desired location. The actuations are then adjusted to provide a horizontal force to move the platform right or left to maintain the desired position. The actuations can also be adjusted to provide a torque to rotate the platform to maintain a desired orientation.

Figures 7, 8:
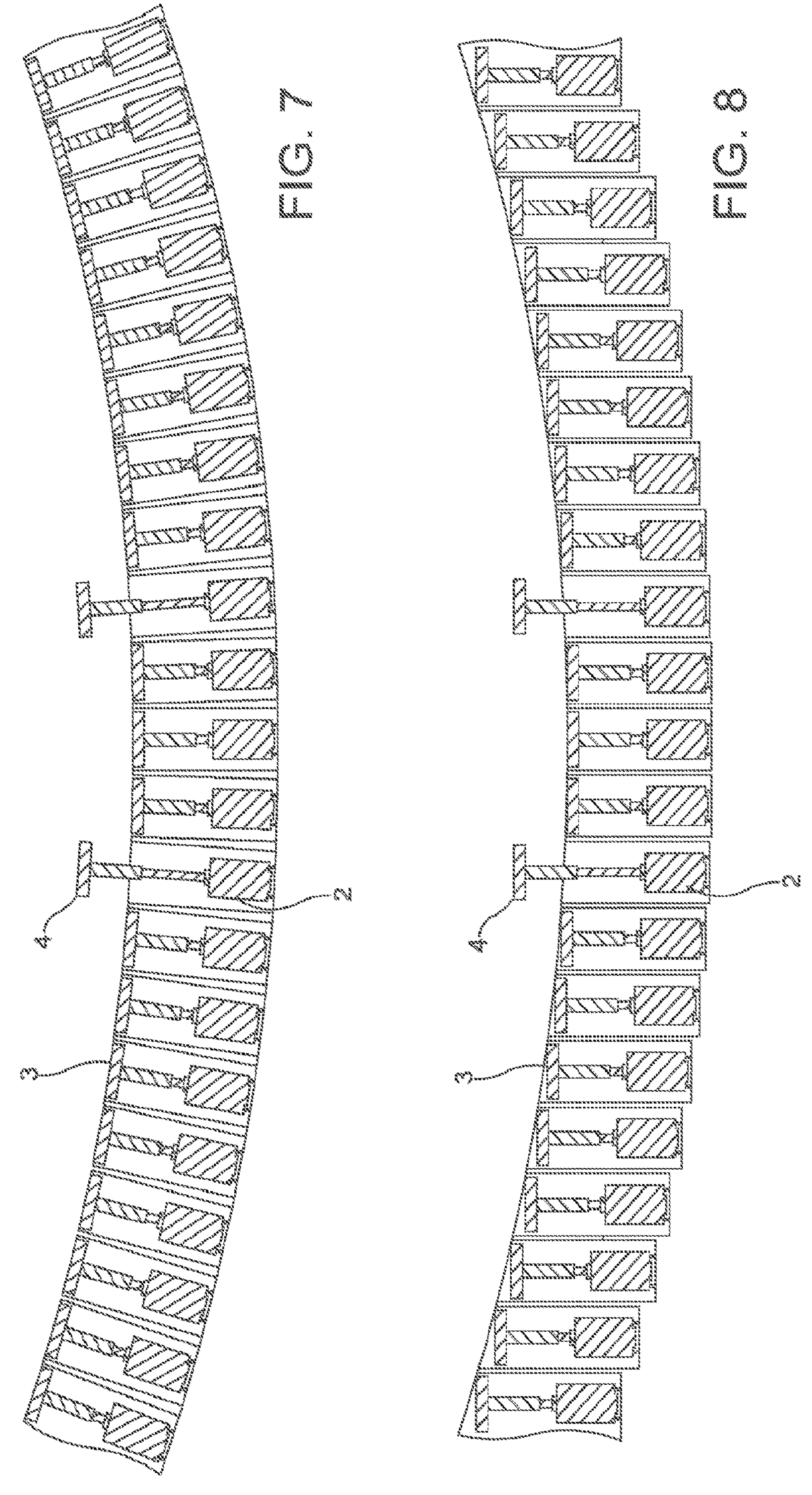
FIG. 7 is a sectional view from the side of a bed of actuated magnets which has varying slope. The actuation direction of each actuated magnet is perpendicular to the tangent plane of the base array at the magnet's location.
FIG. 8 is a sectional view from the side of a bed of actuated magnets which has varying slope. The actuation direction of each actuated magnet is parallel to gravity at every location in the base array.

Electromagnets may be added to provide additional stability control and movement control. These electromagnets may be interspersed between or incorporated into the permanent magnets of the base array, and turned on and off at different current intensities at will. FIG. 7 shows an electromagnetic coil (13) surrounding an actuated permanent magnet (3, 4), and which can boost, reduce, fine-tune or replace the magnetic field of the coupled actuated permanent magnet. This type of actuated permanent magnet/electromagnet can replace any or all of the actuated magnets as shown in FIGS. 1-5 and 7-8.

Electromagnets may replace all or some of the permanent magnets on the base array. These electromagnets would not move up and down; instead they would turn on and off, each providing a similar amount of magnetic force as one offset permanent magnet. Each electromagnet could also be turned on at a lower current intensity, to simulate a partially raised offset permanent magnet, or a higher current intensity to provide more magnetic force.

Sensors can be used to effectively perform feedback stability control. Different types of sensors, such as optical, Hall effect, ultrasonic, capacitive and inductive sensors, may be used to determine whether the levitated array is in the desired position, and whether it is stable. For example, a sensor on each actuated magnet may determine whether the levitated array is the proper distance away. In another example, sensors may be deployed on the levitated array, whether it be on the edges or in the middle of the array, to sense whether the levitated array is centered above the offset array. Depth sensors, microphones, and optical sensors such as visible light and IR cameras may be located anywhere on or outside of the system.

One or more spinning gyroscopes can be used to increase the stability of a levitated object, in the same way that it can be used to reduce rocking of a boat. The gyroscope is attached to the levitated object, in an orientation such that its angular momentum will dampen any rolling motion in an expected direction. Sensors on the levitated object may sense the direction of any roll and the gyroscope may be adaptively controlled, and tilted in a direction opposite the sensed rolling motion of the levitated object, exerting forces that correct for the roll. Devices known as control moment gyroscopes, reaction wheels, or moment wheels may provide this capability. The techniques are especially valuable for non-static loads, where the load's location and center of mass may shift over time.

In some embodiments, offset arrays are not needed to provide stability or provide much or any levitation force. For example, levitated objects could slide across a slippery floor, or have wheels or casters or ball bearings attached to the underside of the levitated object. The levitated object could be mounted on rails or a zip line. For each of these, actuated magnet offset arrays would be needed only to propel, steer and stop the levitated object.

A levitation system for a factory and warehouse transport system, based on offset magnetic arrays: Utilizing the levitated platform system, and the means of moving the levitated platforms as previously described as a foundation, FIGS. 10 and 11 add a "false floor" (7) above the base magnetic array (6), and one or more offset subarrays of magnets. Above the false floor (7) are one or more levitated magnetic platforms/objects/cargo (9) with levitated arrays of magnets attached underneath (not shown), which are levitated and adaptively controlled by the offset subarrays beneath the false floor (7). In a factory setting, adaptively controlling and moving the levitated cargo (9) via the offset magnet subarrays allows for transporting materials placed onto the levitated magnetic platforms from one location within the factory to another. Also, the levitated arrays of magnets may be built into the structure that is used to transport materials from location to the next, such as a levitated storage bin, or the levitated magnetic platforms may be built into pieces of machinery that are moved from one location to the next, such as a toolbox, or a fan.

A user or some other external force could push a load across and above the floor, levitating above the actuated magnet bed. The underlying actuated magnets (3, 4) raise up to create small dynamic offset subarrays underneath the levitated array on the cargo (9) as shown in FIGS. 1, 2, 3, 10, 11 and 12. Without physical restraints, however, the levitated array's position is inherently unstable (see discussion of Earnshaw's theorem.) As discussed in our U.S. Patent Application 62/706,355, incorporated here by reference, sensors can be used to sense the position of the upper levitated array in relation to the offset subarray and the entire lower bed, as well as to sense the levitated array's velocity, acceleration and rotation. In response to this information, using an adaptive feedback process, magnets in and around the offset subarray raise and lower to provide forces which nudge and tug the levitated array into a position as close to precisely above the offset subarray as possible, keeping it stable.

Once an item of cargo (9) has been transported to its desired location, the offset subarray (5) need only be lowered to the base level, and the cargo is no longer levitated, and rests on the false floor (20). Although described above as a false floor, the floor may itself be suitably durable and structurally sound to allow normal foot traffic and mechanized factory equipment to traverse atop it.

Rather than requiring an external force to push and guide the levitated cargo, magnets in and around the offset subarray can nudge the levitated array underneath the cargo with more force, causing the levitated array and attached cargo to move, speed up, slow down, change direction, rotate and stop. When performing these functions, the offset subarray magnets are additionally providing levitational force and stabilizing the levitated array, all at the same time. Information from the same sensors used for stabilization can also be used to inform and instruct the actuated magnets how to move, in order to cause acceleration and deceleration of the levitated array and attached cargo container. A false floor may not be needed to cover the lower bed of magnets, if a user doesn't need to walk along with the cargo.

Many variations on this transport system can be imagined, such as systems ranging from having pre-set tracks and destinations, to having temporary conveyer belts or trains created, used and discontinued as needed, to systems allowing single levitated objects to travel anywhere within the system. A robotic vacuum with a levitated array of magnets around its perimeter could clean a floor without touching or minimally touching the floor, and it could move with greater precision than one with wheels. More generally, any robotic system could be integrated with a levitated magnetic platform, thereby becoming a levitated object, and eliminating the need for wheels for transport.

These systems can be scaled to work in many environments, as on a countertop, moving or levitating in place houseware or electronic appliances to assist in daily activities such as cooking, where a recipe in a book or electronic device could be levitated and moved over a countertop without getting dirty. It can be used in a hospital, so that people typically on wheeled machines and beds are instead transported across the hospital on levitated machines, so they do not touch the floor and spread contamination as they travel from one location to the next. Movement of patients in their beds would be fast, effortless, smooth and quiet. Doctors and nurses could ride on levitated platforms (with function similar to today's segway) around a hospital, similarly avoiding touching the floor. The system can be used in a manufacturing or warehouse environment, to transport robotic systems from one task to the next.

Another method for achieving lateral forces in a large levitated array involves removing some of the magnets near the center of the array. As previously mentioned, the levitation force in this case is not severely reduced. We can use offset magnets near the exposed inner edge of this levitated array to produce a horizontal force, instead of or in addition to using offset magnets near the outer edge of the array to produce the horizontal force. A sizeable horizontal force is created as magnets are moved close to the inner edge of the levitated array.

The shape and size of the base array may vary almost infinitely. It may be narrow and very long, or it may be a big circle, or a rectangle, or a zig-zagging track. The shape and size of the offset array and the levitated array may also vary in shape and size.

The base array need not be perfectly planar; the base arrangement of magnets may be flat, level and planar, or it may be sloped and planar, or it may have topographical features such as hills and bowls, ridges and valleys, as shown in FIG. 6. Actuated magnets which are located on sloped areas may be actuated in a direction which is perpendicular to the tangent plane at that point, or in the z-direction where z is parallel to gravity, or in some other direction. Each magnet's magnetization direction may be the same as its actuation direction, or it may be different; it may be perpendicular to the tangent plane, or in the z-direction, or in some other direction.

The inventors have performed and continue to perform simulations to determine optimum actuation directions when the base array is sloped, as well as optimum magnetization direction for base and levitated magnets in sloped situations. The offset array and levitated array may not be perfectly planar relative to the base array, or relative to each other.

Figures 13, 14:
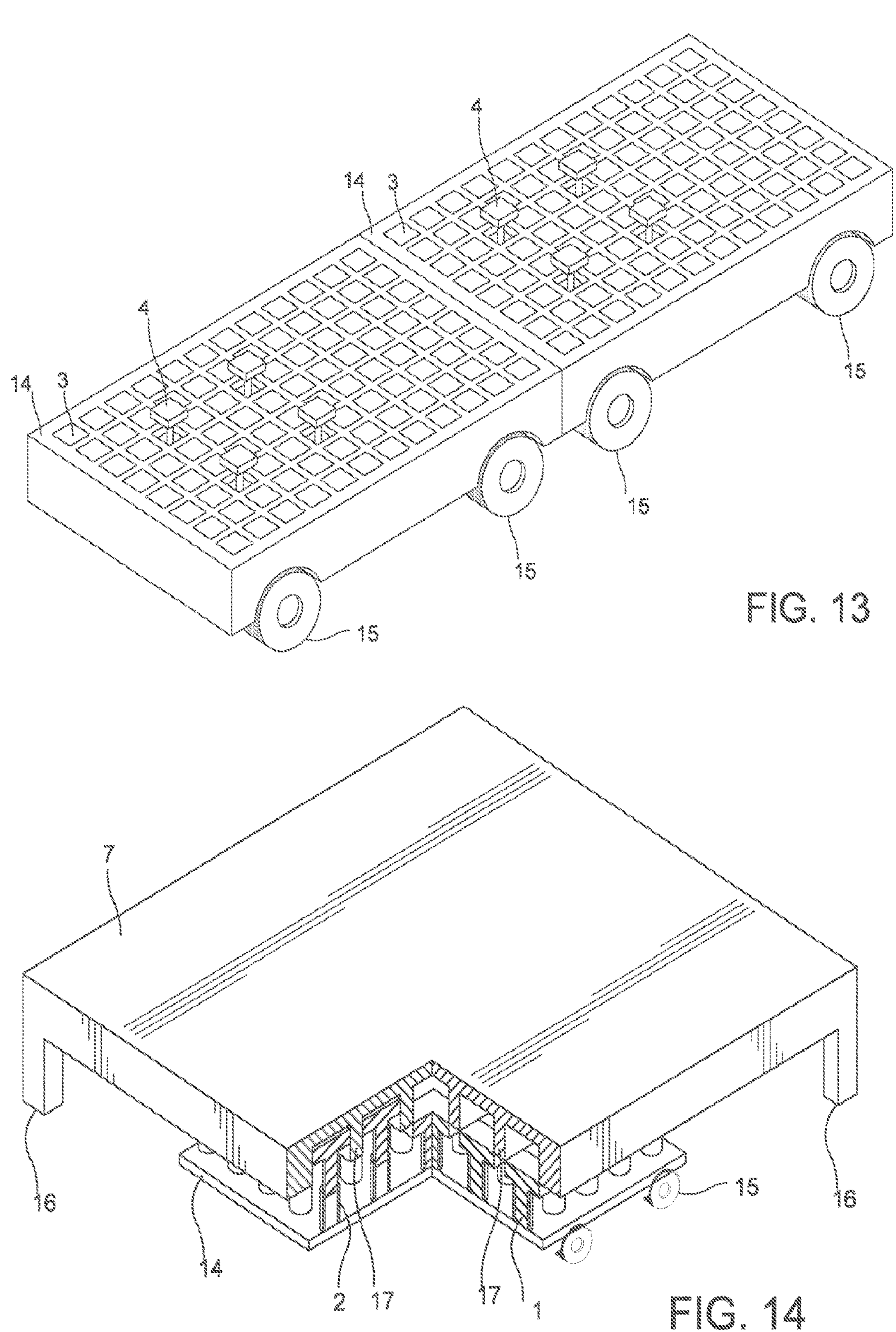
FIG. 13 is an isometric view of a transport system consisting of multiple moveable decks, each of which is covered with an array of actuated magnets which can levitate cargo like the transport system shown in FIGS. 1, 2 and 3, or underneath a false floor as shown in FIGS. 10, 11 and 12.
FIG. 14 is an isometric cutaway of a grid false floor configured to be used with moveable decks like those shown in FIG. 13. A section is cut out of the false floor and the deck beneath to show some of the actuated magnets raised up into the holes of the grid in the false floor, and other actuated magnets remaining below the bottom of the false floor.

Moveable decks, as shown in FIGS. 13 and 14, eliminate the need for the lower bed of magnets to be permanently stationary or permanently attached to a specific location; instead, the underlying base array of actuated magnets is attached to one or more moveable decks (14) which can travel along the ground, making a stationary path for cargo—that is, stationary while the cargo is on top of a deck (14). The decks may move on wheels (15) or by some other means. Two or more decks work together in series and also possibly in parallel (as an example, two decks side by side underneath the cargo for a situation with four or more moveable decks) to underly and support the cargo container as the cargo container moves. Each deck has an array of actuated magnets (3, 4) covering its top surface. Before a cargo container moves onto a deck, the deck must set securely and immovably on the ground, for example by locking its wheels in place, extending stabilizers to lift its wheels, or by raising the wheels or lowering the deck so that the deck's frame touches the floor around the wheels. The deck also levels itself as much as possible. The user guides and pushes the cargo container across the unmoving, level deck as actuated offset magnetic arrays raise and lower themselves from the deck to levitate and stabilize the cargo container. An additional deck moves into place adjacent to the first deck, and sets itself before the cargo container moves on top of it. After the cargo container, and the user if the cargo is being guided by a user, moves off of the first deck, the first deck unsets itself, so that the deck can move to the next spot in the projected path of the cargo container. Two or more separate wheeled decks serially work together to levitate the cargo container along its intended path.

A false floor (7) may be placed above the region where the moving decks (14) operate, so that a user pushing the levitated cargo has a surface to walk on. The false floor needs stanchions (16) or other strengthening and structure to support traffic exerting force on the false floor, and yet it must be relatively thin to allow the base magnets to approach close enough to the levitated magnets so that the magnetic fields can interact through the floor. In systems where the actuated magnets in the base array are stationary, attached to the ground, as shown in FIGS. 10, 11 and 12, then the false floor can have as many supports as desired, in whatever shape and location, to give it strength. However, when large moving decks are moving around under the floor, they must avoid and fit between the stanchions.

In the event that a thin flat false floor would not provide enough support for the weight expected to rest or travel on it, alternative versions of a false floor may be used with moving decks, as shown in FIG. 14. Keeping in mind that magnets repelling each other should be in close proximity, the floor can have a grate of thicker strong beams (17) incorporated into it, with regular holes or openings which match up with the pattern and shape of actuated magnets (1, 2) on top of the decks, so that a deck can align itself underneath the grid floor, and the actuated magnets can extend up along the openings in the grate, moving close to the magnets on the underside of the cargo. As with the large thin false floor, the decks would need to steer around the floor stanchions (16).

The moving decks may also operate on top of a floor, or the ground, without a larger false floor. In this case, a false floor is integrated into the top of the movable deck allowing a user pushing the cargo to walk over the movable deck which has securely immobilized, without stepping on the underlying base array of actuated magnets.

The base array of actuated magnets atop the moveable decks can also levitate, stabilize and accelerate/decelerate the cargo container across the moveable deck's surface, eliminating the need for a user or external force to push or guide the cargo. A series of two or more decks work together to form a path and magnetically support the cargo container along the path. Without a user walking over the moving decks, a false floor may not be necessary.

In another embodiment of the moveable decks, each lower moveable deck can be moved using an underlying bed of electromagnets, instead of having wheels. In this embodiment, the underlying electromagnets would simulate small offset arrays, by turning each magnet on to simulate a raised magnet; off to simulate a lowered magnet; higher power to simulate an offset magnet moving upward and nudging the object upwards; and lower power to simulate an offset magnet moving downward and dipping the object downwards at that location. On its bottom surface, the moveable deck would have an array of permanent magnets, which the underlying bed of electromagnets acts on to levitate and relocate the moveable deck. The mass of each unloaded moveable deck is much less than that of the cargo to be moved. The electromagnets use a large but manageable amount of electricity to levitate, stabilize, and move the empty decks. When a deck reaches its destination as part of a path, the underlying electromagnets gradually turn off to set the deck on the ground. When the deck is set and immovable, it is ready to actuate its own actuated permanent magnets to levitate the heavy load which begins to travel across the set deck.

Integration with existing electromagnet movers: The moveable decks can be integrated with, or rest atop an electromagnet mover, such as those manufactured by Planar Motor or Beckhoff. These mover systems suffer from low load capacity and high energy requirements. By integrating our moveable deck system with these planar mover systems, we endow these systems with heavy load capabilities, with the capability of lifting hundreds and even thousands of pounds with our actuated magnet system. Similar to the previously described deck embodiments, the moveable deck incorporating the lower bed of actuating magnets is transported from one location to the next by the underlying planar motor system, and is set down one after the other to transport a levitated cargo container across the moveable deck surfaces.

In all of the cargo transport embodiments, the cargo container can be a platform, bucket, box, crate, bed, chair, or other object which can carry a load or person or animal. The cargo container can be replaced with an item to be moved which can itself be directly levitated, so long as one or more magnetic arrays can be securely attached to or incorporated into the underside of the item, and the item can be balanced according to its center of gravity. Shifts in the load can be handled by the rails in path embodiments, and by stabilizing movements of actuated magnets.

Magnet sizes within the base array may vary, and the magnets attached to the levitated cargo container may or may not be of the same size, shape, type and strength as magnets within the base array.

In our early research, we found that when raising/offsetting magnets from the base array underneath magnets of the levitated array, the levitation force on the levitated array increased. We later observed that when magnets from the base array are offset above the non-offset bed of magnets within the base array, the levitated array magnets are also moved further away from the non-offset bed of magnets within the base array. This displacement of the levitated array magnets from all of the adjacent non-offset magnets within the base array is important because it moves the levitated array (partially or totally) out of range of the attractive forces from these adjacent base array magnets. The repulsive forces from the magnets raised underneath the levitated array continue to act on the levitated array, while the attractive forces from adjacent bed magnets which had been competing with the repulsive forces are now substantially reduced. The result is increased levitation forces per unit area. Furthermore, using the observation that adjustments of spacing between levitated magnets reduce adjacent magnet attractive forces, we can now better describe potential optimum levitated array geometries.

The optimum configuration for a levitated array of magnets may be determined by optimizing the levitation forces per unit area between a levitated array and the lower offset array. Since we have shown through simulations that when 1-inch by 1-inch base array magnets are shifted approximately 105% (or separated by a lateral gap 5% the width of the magnet), attractive forces between the adjacent shifted magnet and the levitated magnet are greatest, we know that appropriate spacing is needed between each magnet in the levitated array and the offset magnets within the base array to generate optimum forces per unit area on the levitated magnet and therefore the levitated platform. Exemplary designs that incorporate spacing into the levitated array design include a perimeter, an X shape, a checkerboard and a pattern of small squares, as shown in FIG. 6. In order to lift and move levitated arrays with these designs, the actuated offset magnets within the base array would optimally mirror the levitated array design, with additional strategically positioned offset magnets to create the horizontal forces needed for movement.

The spacing that separates the magnets in an array does not need to be the same for the levitated array and the base array, nor does it need to be uniform. The magnet spacing in the levitated array can, for instance, be larger than the magnet spacing in the lower platform array, and can be optimized for different applications. The inventors have performed and continue to perform simulations to determine optimum lateral spacing and configuration of base magnets and levitated magnets, which varies according to size and strength of magnets, as well as amount of mass to be lifted and transported, speed and reaction time desired or required, and other variables. For instance, in one application the magnet spacing may be optimized to produce maximum lift, while a different array spacing may produce maximum horizontal forces.

Furthermore, both the lower offset array and/or the levitated array could include functionality allowing the lateral magnet spacing to be dynamically controlled, so that the magnet spacing can be changed as a function of time or depending on the task to be performed. The levitated array may also include functionality for changing its geometry.

In another embodiment, both base magnets and levitated magnets are actuated. Use of actuated magnets on the levitated object adds mass to the levitated object, and requires a power source, which adds complication and cost. However, when the levitated magnets are actuated, then base magnets can be placed further apart, and in some embodiments base magnet spacing is greater than actuated levitated magnet spacing, reducing the number of magnets needed in the base array, and thus reducing overall cost. Additionally, for some applications it will be possible to eliminate actuation of and power to the base magnets, resulting in a substantial lowering of cost.

Actuated levitated magnets can be used to provide levitation force, adaptive stability and lateral movements, using the same concepts as those described for base actuated magnets. In a preferred embodiment, base magnet actuation would be used to provide levitation force and lateral movements, and levitated magnet actuation would provide adaptive stability.

The geometry of the levitated array magnets acting on the base array may be changed, through vertical actuation of the levitated magnets to create offset sub-arrays, or through lateral adjusting of levitated magnets, or other methods.

In another embodiment, levitated magnets are actuated while base magnets are non-actuated. Following the principles laid out regarding magnet array spacing and offset magnet distances required to generate required repulsive forces, actuated magnets within the levitated array are actuated to create an offset subarray that approximately mirrors the arrangement of non-actuated permanent magnets within the base array. Dynamically adjusting the position of actuated magnets within the levitated array provides the levitation forces, and the adaptive repositioning of levitated magnets provides stability to the levitated object.

Horizontal motion of the levitated object can be accomplished through various means, including actuating magnets on an edge of the levitated object such that the actuated magnets on the edge are so angled or positioned that when actuated, the magnetization vector of the actuated magnet contains a substantial non-zero component in the direction opposite the desired direction of travel, thereby creating a strong repulsive force with a component of the magnetization vector from one or more magnets from the base array, which pushes the levitated object in the desired direction. To accomplish continuous motion, actuated edge magnets would be repetitively retracted and then actuated, to apply continuous repulsive forces to the levitated object.

Any means of propelling the now levitated object are incorporated as part of this invention. Additional means of generating horizontal motion of the levitated object which contains actuated permanent magnets include, but are not limited to: (1) any means of repetitively creating repulsive forces with magnets in the base array through actuating magnets in the levitated array that push the levitated object in the desired direction, (2) the use of electromechanical systems integrated into or attached to the levitated object such as wheels or mechanical arms or legs, that are in constant or temporary contact with the base array top surface, false floor above the base array, or rails, thereby propelling the levitated object, (3) forced air such as with onboard fan, compressed air, or pressurized gas emissions, or atmospheric airflow that imparts a force to onboard sails (4) or through an independently powered and controlled system such as a “tug” robot, a human, or machines that push or pull the levitated object in a desired direction.

The foregoing cargo transport embodiments are assumed to be for the purpose of moving a load from one place to another, and they all serve that purpose—reaching a goal. However, sometimes the journey is what’s important, as in an amusement park ride. The levitation systems described herein can be used to create a ride with virtual reality features, transporting riders along a path, providing acceleration and deceleration, bumps, spins, and other haptic and proprioception effects familiar to Disney World amusement park visitors.

In contrast with traveling from point A to point B, the purpose of the next set of embodiments is to support and make a person feel like they are locomoting through space, when in fact they remain in one spot, similar to a treadmill.

Figures 15, 16:
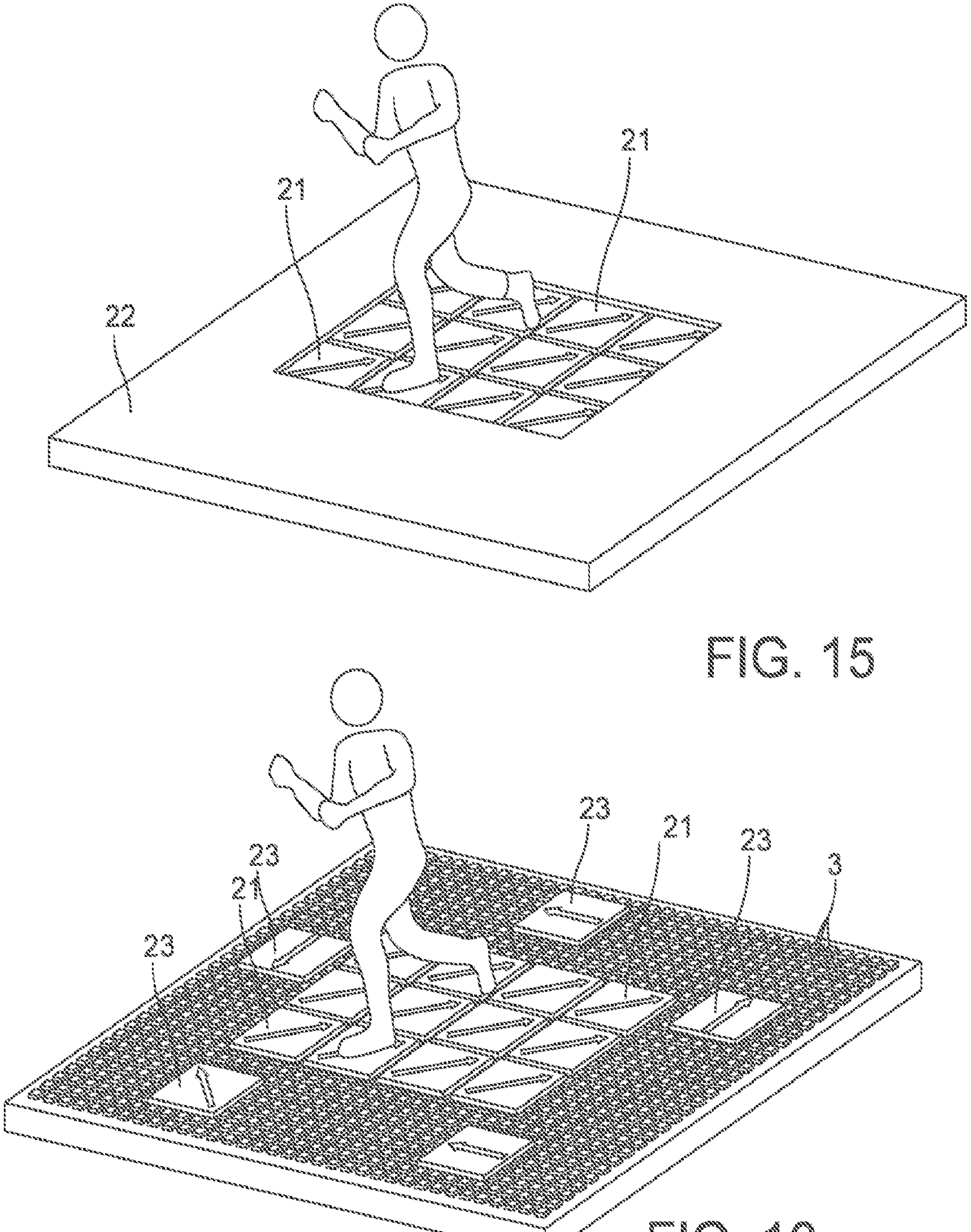
FIG. 15 is an isometric view of a treadmill, showing a person walking on levitated platforms in a walking area, and the remainder of the treadmill covered by an upper false floor.
FIG. 16 is an isometric view of the treadmill shown in FIG. 15, with both the upper and lower false floors removed, revealing the bed of actuated magnets as well as levitated platforms which are travelling in the return area.
Figure 17:
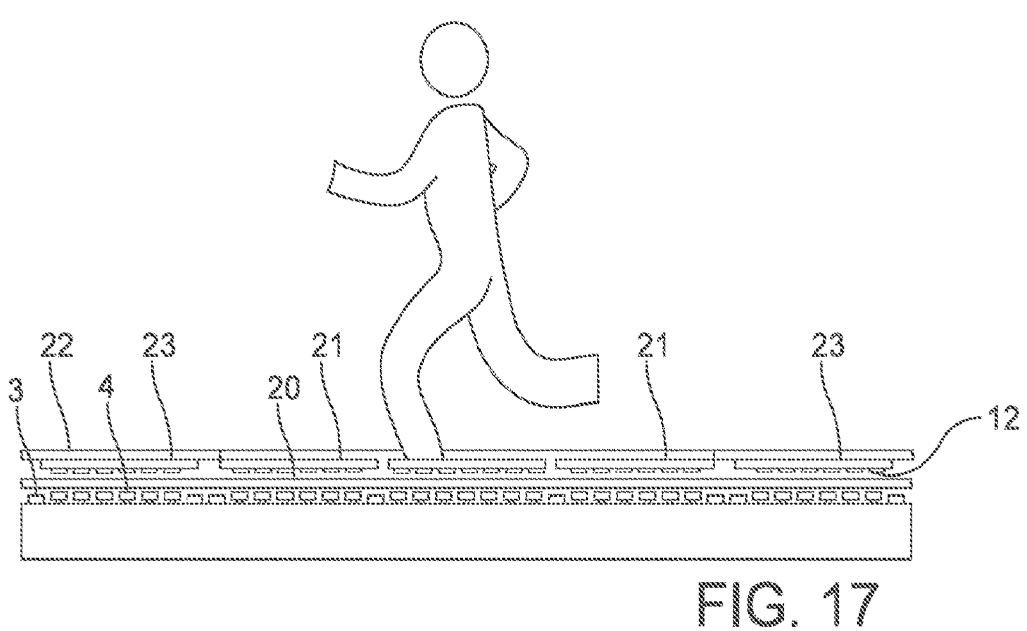
FIG. 17 is a side cutaway view of the treadmill shown in FIGS. 15 and 16, showing the bed of magnets with some actuated so as to lift the levitated platforms; the lower false floor covering the bed of magnets; several levitated platforms in the walking area and two levitated platforms in the return area, the upper false floor covering the return area, and the walking person.

In a treadmill embodiment shown in FIGS. 15, 16 and 17, a lower bed of actuated magnets (3) in an array formation rests under a lower false floor (20) which is capable of supporting a person’s weight. There is a central “walking area” portion where levitated platforms (21) are exposed, and a “return area” outside of the walking area, where an upper false floor (22) capable of supporting a person’s weight covers any levitated platforms (23) which are not in the walking area. In the central walking area, multiple small platforms (21), each having a magnet array (12) on the underside, levitate above the lower false floor (20), in a rectangular grid covering the entire walking area, with very little space between levitated platforms. Each platform is levitated and stabilized by small raised offset arrays of magnets (4) from the lower bed of magnets, as described above. A user steps onto any one or combination of the levitated platforms with a first foot, and begins to walk, pushing backwards with the first foot. In response, the entire rectangular grid of platforms moves backward, with additional platforms from the return area joining the grid at the front, so that the entire walking area remains covered. The user steps with a second foot onto a second single or combination of levitated platforms in the rectangular grid of platforms. This process of the levitated platform then sliding back under the walker's body is repeated, and a stream of levitated platforms moving in the opposite direction of the walker's intended direction are placed before the walker, presenting the simulated experience of walking in a straight line. Each platform adaptively and dynamically supports the weight of each footstrike to minimize dips and bounciness. Assuming the user moves their legs to walk in a forward motion, all of the platforms in the walking area move backwards at the same speed as the user's foot. When a foot lifts off of the levitated platforms to step forward, the levitated platforms, now free of load, continue backwards towards the back of the walking area, supported by underlying offset arrays of magnets, and when they reach the back edge of the walking area, are carried to the return area of the apparatus, through a slot which leads underneath the upper false floor to the return path beside the walking area. The levitated platforms are concealed as they travel underneath the upper false floor, and are carried around to the front of the apparatus, where they emerge from another slot to join the grid over the walking area, ready to support a foot again. Multiple levitated platforms travel around the loop in this way, so that levitated platforms are always ready in place to support the user's next footstep.

As the walker (runner) changes their walking speed, the speed of each of the levitated platforms under the walker is adaptively controlled to respond to this change in speed. The system allows for instantaneous change in speed of the levitated platforms, very closely simulating the start and stop motions of natural walking or running.

We compare a traditional treadmill system with our levitated system. In a traditional treadmill, rotary motors and pulleys are used to move a flexible running surface around a continuous loop. The motors, belts pulleys etc. all have significant mass and inertia which is directly coupled to the motion of the running surface. To change the direction of the running surface, the rotation of the drive system must change rotational direction. The inertia of the system however slows the response time of the system making it difficult to undergo rapid changes in direction. By contrast, the levitated system decouples the motion of the control system from the motion of the mover. The control system consists of small actuated magnets which move perpendicular to the moving surface. The small mass allows for rapid changes in drive force, and the inertia of the drive system is orthogonal to the mover surface so the inertia of the mover does not slow the response time of the actuators.

The speed and direction of the levitated platforms in the walking area can be controlled with user input, as in a common exercise treadmill—higher and lower speed, and forward or backward. The platforms could also be sloped continuously from one end of the walking platform to the other, to mimic walking up or down a hill. To slope the platforms continuously across the false floor walking area, base array actuated magnets at the front of the walking area would be extended higher (closer to the false floor) and the extension height of actuated magnets would gradually decrease, simulating the slope desired to impart on the levitated platforms.

To avoid gaps between the levitated platforms, in the embodiment where motion is constrained to only forward and backward motion, non-magnetic material may be used to connect each of the permanent magnets within the levitated platform, and to interconnect the levitated platform to other levitated magnetic platforms, providing a solid barrier thereby preventing the walker from stepping through gaps between magnetic platforms, and impacting the false floor.

Figure 18:
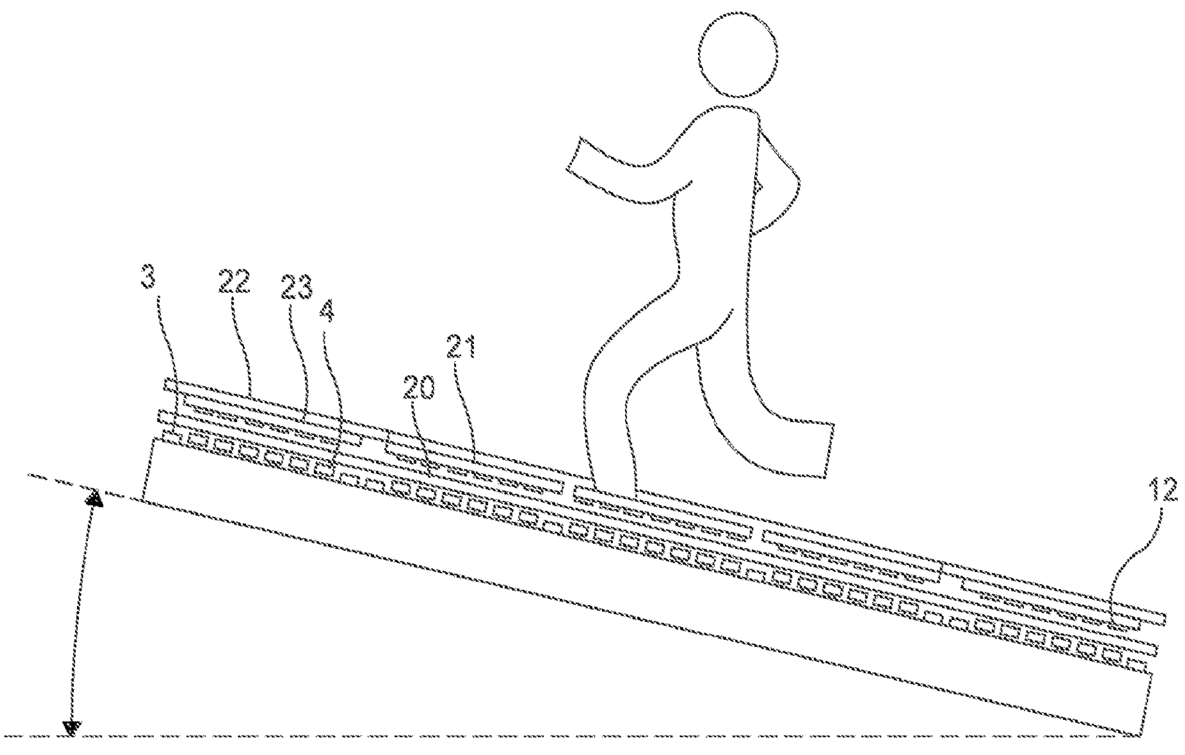
FIG. 18 is a side cutaway view of the treadmill shown in FIGS. 15, 16 and 17, with the addition of an incline.

In an alternative approach to generating a slope, the entire base array and its false floor could also be sloped as shown in FIG. 18, also providing the simulated effect of a hill. In either approach to generating a slope, if the walker stops, the offset arrays will apply a horizontal force to the levitated platform, thereby maintaining the platform's (and the walker's) position. This horizontal force is exerted on the platforms by varying height of appropriate offset magnets, as previously described.

Each of the platforms can have covers (either permanent or replaceable) mimicking different exercise surfaces, like a wooden basketball court, or a grass field, or synthetic turf, or a polyurethane or rubber running track.

If slots allowing platforms to enter and exit the walking area are only positioned in the front and back, then the treadmill embodiment would only allow forward and backward locomotion.

Sensors are needed for feedback adjustments to the underlying offset arrays of magnets, to stabilize the levitated platforms, to keep them balanced, and to handle the added force of each footstrike.

One possible stabilization scheme includes a feedback loop that senses the change in angle and vertical displacement of a levitated platform, and causes the actuators to respond to counter those changes. With a need to sense displacements at an accuracy of smaller than a millimeter, there are a variety of sensors that are viable, including optical, capacitive, inductive, hall-effect, and ultrasonic sensors. We precompute the actuator displacements needed to provide the restoring force. Once a movement of the levitated platform is detected by the sensors, the actuators are activated to provide the restoring force.

The treadmill can also be constructed with a walking area in the center, and a 360° covered return path on all sides of the walking area, as shown in FIGS. 15 and 16. This treadmill embodiment can be limited to forward and backward, or it can be an omnidirectional treadmill allowing the platform grid to move in any direction in the horizontal plane, and including slots on all sides where platforms may exit or enter the walking area as appropriate, to simulate 360° freedom of motion.

Where motion can be in any direction on the levitated platform plane, to eliminate or minimize gaps, the levitated platforms can be of a multitude of shapes, which minimize gaps between adjacent platforms, such as square, triangular, or hexagonal.

Alternatively, a levitated magnetic platform package (consisting of the levitated magnetic platform and non-magnetic material that interconnect and bind each of the permanent magnets within the levitated platform) may be so constructed to be larger than the offset array that is controlling the levitated magnetic platform package. By positioning offset arrays at slightly different heights (and not all in the same plane), the top of one levitated platform package will overlap the top of other levitated platform packages, eliminating any potential gaps between the levitated platform packages and the floor. Furthermore, because the levitated platform packages are larger than the offset arrays, this allows for the required spacing between the offset arrays needed to maximize lift forces of each offset array, thereby enabling the desired levitation lift force.

The foregoing treadmill embodiments allow pre-planned motion—forward or backward, at a preset speed. In order to accommodate a user's unplanned movements, for example for a smoother running experience or a virtual reality application, more sensing and artificial intelligence are used. In these embodiments, by using sensors on the walker, embedded in the platforms, in the base array, or external sensors such as cameras, the system detects a walker's instantaneous change in desired speed, by calculating for example the user's stride length and rate, the location, and the time of impact, and adjusts the speed of the underlying platforms to simulate the walker's intended pace.

As the separation between two repelling magnets decreases, the magnetic forces increase as $1/r^3$ where r is the magnet-magnet separation. This scaling helps mitigate the possible problem of a footstrike causing a levitated magnet to strike the false floor. As the two magnets approach each other and the levitation gap shrinks, the levitation force increases dramatically, which would help prevent collisions in a levitated array application. These forces were calculated with ¼ inch thick magnets. Using thicker magnets on the base array, levitated array, or both, would further increase the levitation force at small levitation gaps.

In a dynamic case such as the treadmill application, the offset permanent magnet based actuated system must respond to changes in the levitated load by moving the magnets in the base array vertically to offset the change in weight on the levitated array. We calculated the difference in dynamic power consumption by comparing a single levitated permanent magnet over a single coil vs a single levitated permanent magnet over a permanent magnet. For this analysis, we did not consider the power required for active feedback, or the inefficiencies in the linear actuator. Therefore, this analysis provides a lower bound to the power required in each system.

For the electromagnetic coil, the power is obtained from $P=i^2R$, where i is the coil current and R is the coil resistance. For the permanent magnet, the power is computed by first computing the energy from $$E = \int_0^{T_{max}} F \cdot dz$$

where F is the vertical force and dz is an increment of vertical distance as the actuators move to respond to the vertical load, and $T_{max}$ is the total time for the impact (300 ms for a footfall). The average power is then $P=E/T_{max}$.

Note that the actuated magnets only require power over one half of the impact curve. For a 2 lb dynamic load, the peak power to balance the impact curve for the actuated magnet is a few watts (average power <1 W) while the peak power required in the electromagnetic case is approximately 1 kW (average power approximately 500 W). This analysis indicates that the electromagnetic levitation configuration requires approximately 500 times (or greater) the power of the actuated permanent magnet configuration. We can extrapolate these single actuator values to a larger array. A comparison of the average powers for the two systems for different dynamic loads is summarized here:

| | Levitated Dynamic Load (10 × 10 array) | | |
|---|---|---|---|
| | 100 lb | 150 lb | 200 lb |
| Permanent Magnet (mean Power) | 34 W | 51 W | 66 W |
| Electromagnetic Coil (mean Power) | 14.4 kW | 32 kW | 58 kW |

An electromagnetic coil system would require tens of kilowatts per square foot to levitate 100 or more pounds, while the permanent magnet system requires less than 100 W. The permanent magnet system can reasonably be ramped up to lift and transport hundreds or thousands of pounds.

The bed of magnets may track and anticipate where the user's foot will fall. This may be accomplished with sensors in the bed of magnets, sensors in the platforms, video monitoring and communication between the bed and the platforms, as in the transport implementations. In addition, a motion tracking suit or shoes worn by the user, using technology such as that described in U.S. patent application Ser. No. 14/550,894, can convey information which can be used to calculate where and when the platforms and underlying offset arrays should be, and how they should move in order to always meet, support and smoothly carry the user's feet.

Figure 9:
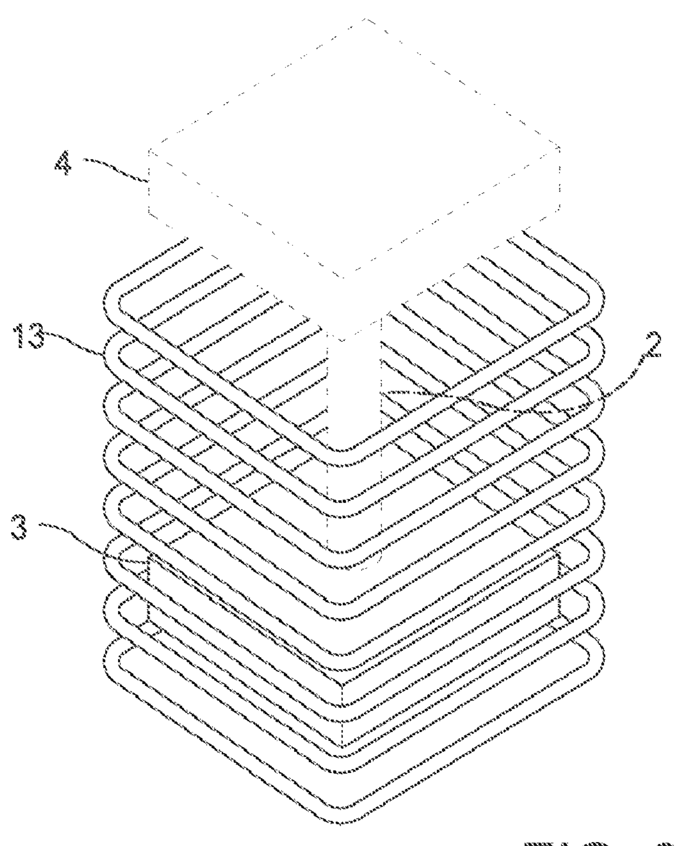
FIG. 9 shows a view from the side of an actuated magnet surrounded by a coil, where the magnet is in two positions: the solid lined magnet is in its base position, within the coil, and the dotted lined magnet is shown in its fully extended position, offset above the coil.

Actuated permanent magnets within the bed may be combined with electromagnets, which are coils of wire (13) wrapped around each magnet (3, 4), as shown in FIG. 9. The electromagnets can provide the horizontal forces to move the unloaded levitated platforms, or fine tune the forces on the levitated magnets for active feedback control. In this scenario, the underlying permanent magnets provide the primary levitation forces, by moving from a base position to an extended position, while the electromagnets may provide the horizontal forces for motion and the adaptive feedback forces for platform stability. For example, each individual actuator (1, 2) and magnet (3, 4) in the bed may be surrounded by an electromagnetic coil (13). Any magnetic force on a levitated magnet above is a sum of the force due to the offset magnet and the electromagnetic coil. The force from the electromagnetic coil will add or subtract from the force due to the offset magnet, depending on the direction of the current in the coil.

The electromagnets allow for fine tuning the position of the levitated magnets within the levitated array, such that small, fast changes in position are possible without having to use the mechanical actuator to change the base array permanent magnet's position. In situations where fast, dynamic adjustments in levitation forces are required, such as in high speed adaptive feedback scenarios, the offset subarray magnets provide the primary levitation forces, whereas changing electromagnet forces provide necessary fine tuning vertical, horizontal and torque force adjustments, and they may also provide the horizontal forces to impart motion to the levitated platform.

Figure 19:
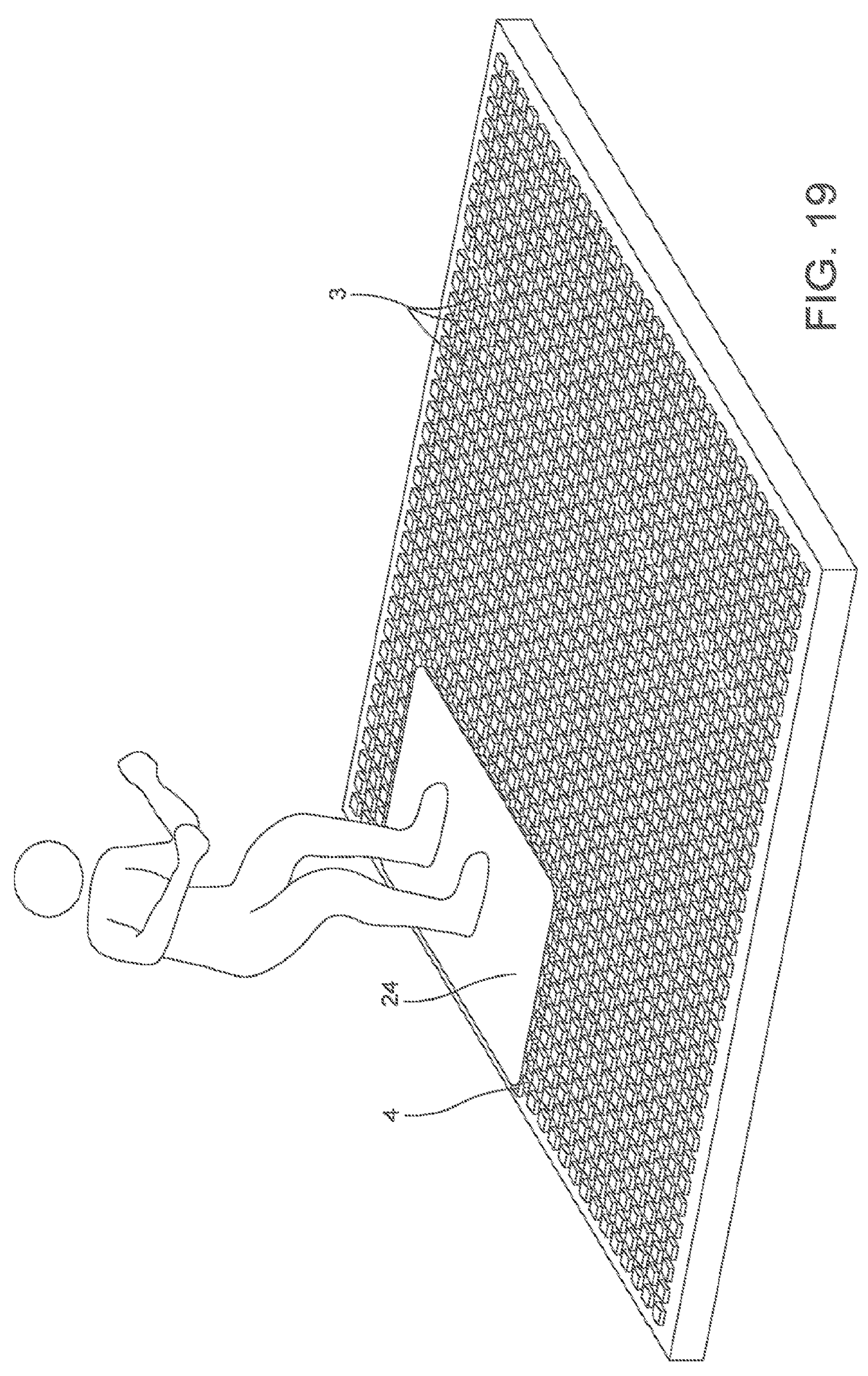
FIG. 19 is an isometric view of a balance board which is supported by actuated magnets from beneath. Levitated magnets attached to the underside of the balance board are present, but not shown.
Figure 20:
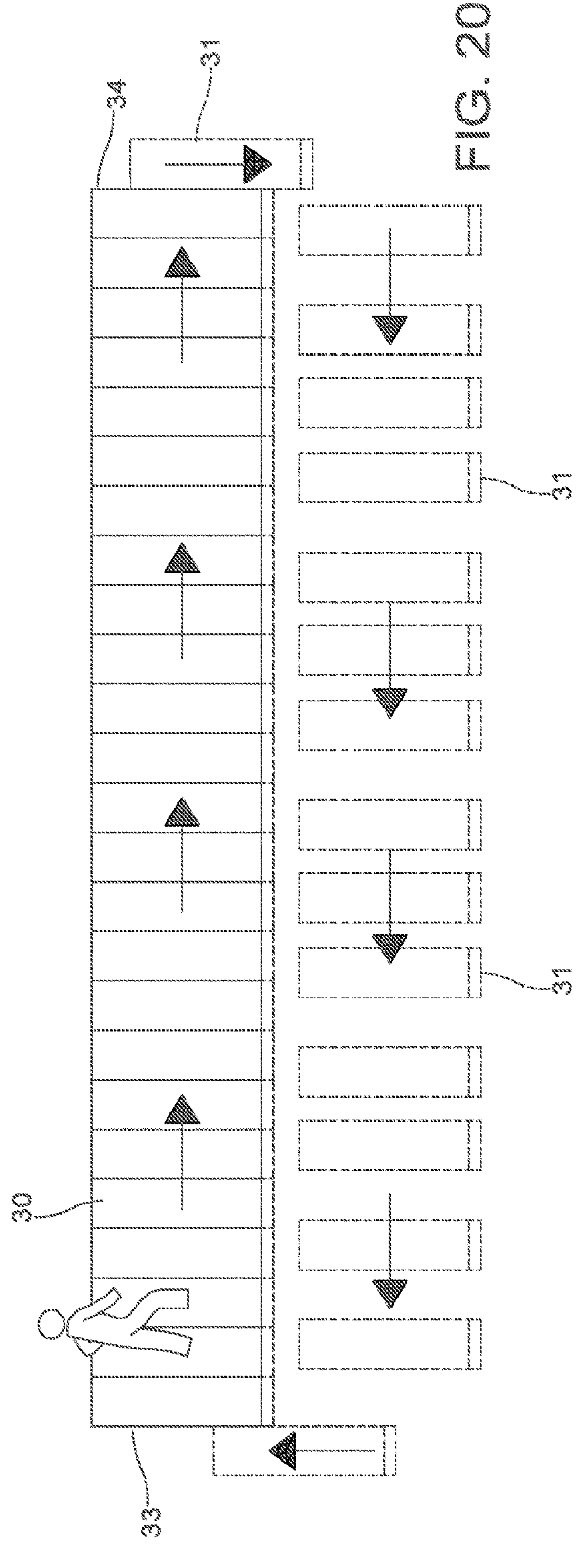
FIG. 20 shows a moving sidewalk with many levitated platforms traveling forward with a user. When each platform reaches the end of the walking area, it then circulates around, back to the beginning of the sidewalk, under a first covered return path, cover not shown.

An alternative to supporting the user's feet on separate platforms would be to provide one platform incorporating a levitated array of magnets for the user to stand on like a skateboard, Wii balance board, surfboard, snowboard or Segway, as shown in FIG. 19. The user balances on the board (24), and can shift their weight and even take small steps on top of the board while the board is levitated. The underlying offset magnetic array moves to stabilize the board, and also can move the board to simulate movement as in a virtual reality ride, allowing the user to experience turns, bumps, rotation forces, motion and accelerations. In this implementation, multiple levitated platforms would not be necessary.

In yet another embodiment, rather than using the levitated platforms to simulate a walking or running motion, the levitated platforms can make up a moving walkway system, as shown in FIGS. 20-23. The moving walkway system consists of a bed of actuated offset magnets (not shown), multiple levitated platforms (30, 31, 32) each with an array or arrays of permanent magnets attached underneath (not shown), a return path (area where platforms marked 31 are shown) for the levitated platforms which may reside under a false floor (implied by showing platforms in the return path with dotted lines, and therefore hidden), and an entry (33) and exit point (34) for the walker between which lies the walking area (area where platforms marked (30) are shown).

The levitated platforms (30) in the walking area move together at the same speed in a forward motion until reaching the exit point (34) of the walkway, at which point they are redirected into a return path area (area where platforms marked (31) are shown) and circulated back to the start (entry point (33)) of the moving walkway. Each of the levitated platforms is supported by actuating offset magnets to provide the required levitation and stability control forces.

Figures 21, 22, 23:
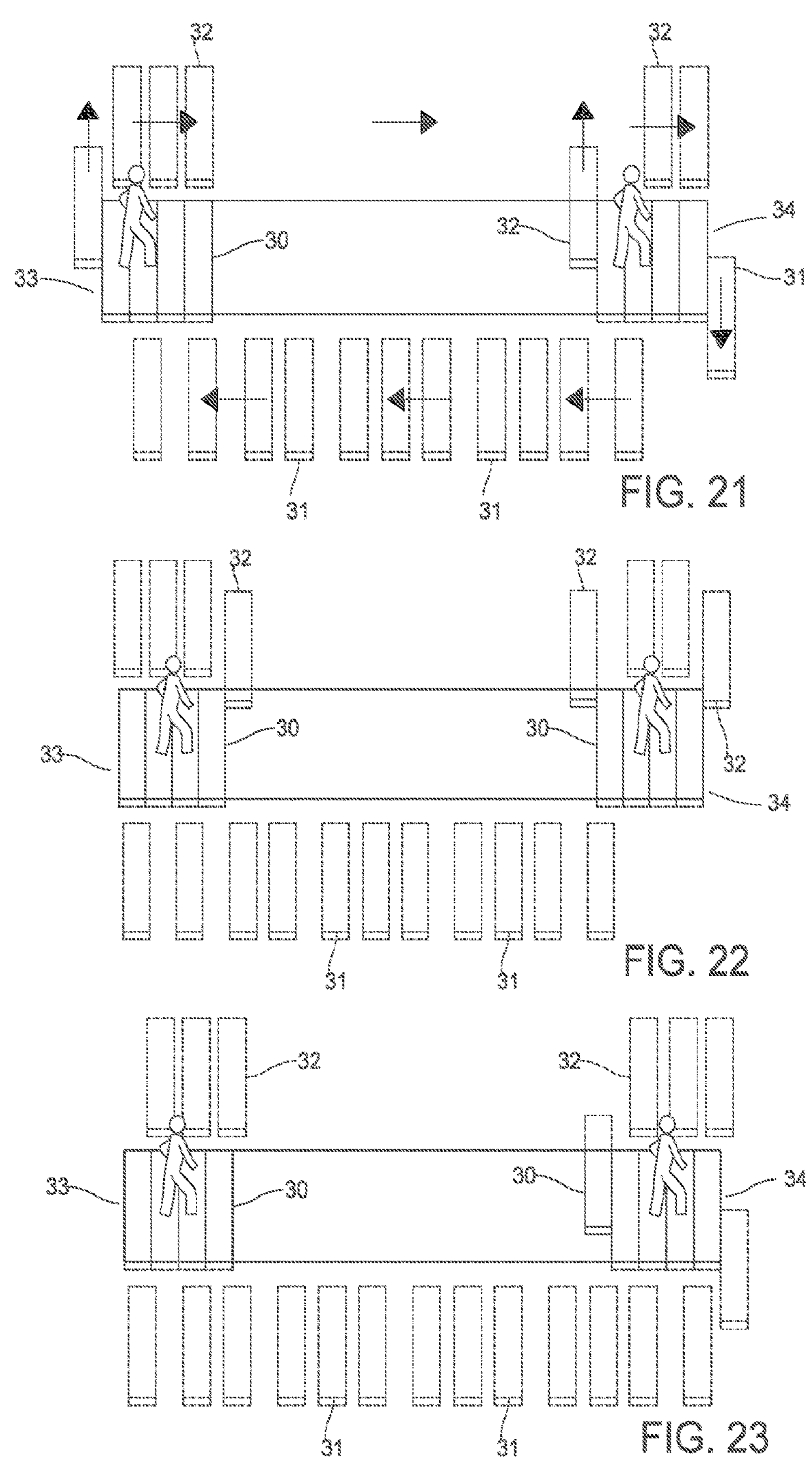
FIG. 21 shows an alternative moving sidewalk configuration, where each user has their own subset of levitated platforms. Each user's subset of platforms moves forward with the user, and new platforms move from a return area to the walking area, in front of the user, when necessary. When a user and their platforms reach the end of the walking area, the user exits the walking area and the platforms circulate back to the beginning of the walking area via a return path.
FIG. 22 shows the moving sidewalk configuration of FIG. 21, with platforms moved to different positions.
FIG. 23 shows the moving sidewalk configuration of FIGS. 21 and 22, with platforms moved to different positions.

Another embodiment of the moving walkway, similar to the original treadmill application pictured in FIGS. 15, 16 and 17, has a set of levitated platforms for each walker, consisting of several platforms (30) in the walking area, which the walker stands or walks on, and several more platforms (32, 33) in the return area (areas where platforms marked (31) and (32) are shown), hidden under a false floor. Each subset of platforms moves forward along the walkway with its walker when the walker stands still. If the walker walks forward while being carried forward by the moving levitated platforms, then the extra hidden platforms (32) must circulate into the walking area for the walker to step on, as shown in FIGS. 21 and 22, while the platforms in the walking area circulate out of the walking area and eventually around in front of the walker. After each walker reaches the exit (34), their set of platforms (31) circulates back in the return area to the beginning of the walkway for the next user, as shown in FIG. 23.

We claim:

1. A levitation and levitated transport system, comprising:

a z-axis, defined to be parallel to a vector of the force of gravity;

an arrangement of base magnets, wherein:

the base magnets comprise permanent magnets;

each base magnet has a magnetization vector, and the magnetization vector of one or more of the base magnets contains a non-zero component in the z-axis;

one or more of the base magnets is configured to be attached to a linear actuator with an actuation distance and an actuation direction, which actuator is configured to lift the base magnet or magnets up in the actuation direction;

the actuation direction contains a non-zero component in the z-axis; and each base magnet is separated laterally from its adjacent nearest neighbor magnets; and one or more arrangements of one or more levitated magnets, wherein:

the levitated magnets comprise permanent magnets;

each levitated magnet is attached to the underside of a levitated object;

each levitated magnet has a magnetization vector, and the magnetization vector of one or more of the levitated magnets contains a non-zero component in the z-axis, and the sign of the z component of the magnetization vector of the levitated magnet is opposite to the sign of the z component of the magnetization vector of one or more of the base magnets, so that the result of an interaction between the one or more base magnets and the one or more levitated magnets is net repulsion;

the one or more arrangements of one or more levitated magnets has a footprint, which is defined as the combined lateral area and pattern occupied by all of the levitated magnets; and an enlarged footprint is defined as the shape and size of the footprint, plus an expanded area around the perimeter of the footprint, appropriately shaped and sized to include one hypothetical additional lateral layer of levitated magnets;

further comprising:

a first nonmagnetic false floor situated between the arrangement of base magnets and the one or more arrangements of one or more levitated magnets, which false floor has a footprint and a plane.

2. The levitation and levitated transport system of claim 1, wherein one or more of the levitated magnets is configured to be attached underneath the levitated object with a linear actuator with an actuation distance, which actuator is configured to detrude the levitated magnet or magnets from a highest level downwards in an actuation direction which has a z-component sign that is opposite to the sign of the z component of the actuation direction of one or more of the base magnets.

3. The levitation and levitated transport system of claim 1, wherein every actuation direction is parallel to the vector of the force of gravity.

4. The levitation and levitated transport system of claim 1, wherein the actuation direction of each base magnet is parallel to its magnetization vector.

5. The levitation and levitated transport system of claim 1, wherein the arrangement of base magnets is planar.

6. The levitation and levitated transport system of claim 1, further comprising one or more electromagnets integrated with the said base magnets or levitated magnets.

7. The levitation and levitated transport system of claim 1, for use as a balance board, wherein one or more arrangements of one or more levitated magnets comprises one arrangement of permanent, levitated magnets, which are all attached to one levitated object, which is configured to receive and support both feet of a human.

8. The levitation and levitated transport system of claim 1 further comprising:

a second nonmagnetic false floor situated above the levitated arrangement of one or more permanent magnets, which second false floor has a footprint and a plane which is parallel to the plane of the first false floor.

9. The levitation and levitated transport system of claim 8, for use as a single-directional or omni-directional treadmill-like machine to support a human, further comprising:

wherein the levitated object comprises a multiplicity of levitated objects, each levitated object being configured to receive and support one foot of a human; and wherein the footprint of the second false floor is different from the footprint of the first false floor.

10. The levitation and levitated transport system of claim 9, wherein the arrangement of base magnets has a plane which is parallel to the plane of the first nonmagnetic false floor, and wherein both planes are sloped such that the planes are not perpendicular to the vector of the force of gravity.

11. The levitation and levitated transport system of claim 1 further comprising:

wherein the nonmagnetic first false floor comprises a top surface, a bottom surface, a plurality of vertical openings in an arrangement, and a grid with a height, which is defined as the distance between the top and bottom surfaces, and wherein the grid height is compatible with the actuation distance expected from the actuated base magnets; and wherein the arrangement of the vertical openings is compatible with the arrangement of base magnets.

12. The levitation and levitated transport system of claim 1, wherein the arrangement of base magnets is attached onto a moveable object, deck or vehicle.

13. The levitation and levitated transport system of claim 12, wherein the moveable object, deck or vehicle is configured to be moved by a planar motor system.

14. The levitation and levitated transport system of claim 1, wherein the arrangement of actuated base magnets is attached onto a moveable object, deck or vehicle.

15. The levitation and levitated transport system of claim 14, further comprising:

wherein the nonmagnetic first false floor comprises a plurality of support posts, a top surface, a bottom surface, a plurality of vertical openings in an arrangement, and a grid with a height, which is defined as the distance between the top and bottom surfaces of the grid, and wherein the support posts are arranged in a configuration such that the moveable object, deck or vehicle can move and fit between the support posts; and wherein the grid height is compatible with the actuation distance expected from the arrangement of actuated base magnets located on the moveable object, deck or vehicle; and wherein the arrangement of vertical openings is compatible with the arrangement of actuated base magnets.

16. The levitation and levitated transport system of claim 1, wherein:

the one or more arrangements of one or more levitated magnets are controlled so as to move the levitated object laterally across the arrangement of base magnets.

17. A method of levitation and levitated transport, using the system of claim 1, comprising the steps of:

raising one or more offset arrays of base magnets using the actuators, the offset arrays being configured to imitate one or more of the levitated magnet arrangement footprints, and at least a portion of each magnet in the offset array being dynamically situated directly underneath the levitated footprint; and dynamically lowering any raised offset base magnets which are not currently situated directly underneath the levitated enlarged footprint.

18. The method of levitation and levitated transport of claim 17, additionally comprising one or more of the steps of:

raising one or more base magnets which are located beside a levitated magnet arrangement, for the purpose of pushing the levitated magnet arrangement away from the raised base magnets using magnetic repulsive force; or raising one or more base magnets which are located beside a levitated magnet arrangement, for the purpose of pulling the levitated magnet arrangement toward raised base magnets using magnetic attractive forces;

raising one or more base magnets which are located ahead of or beside a levitated magnet arrangement which is laterally moving, for the purpose of slowing or stopping or redirecting the movement of the levitated magnet arrangement; or lowering one or more raised base magnets which are located under one side of a levitated magnet arrangement, for the purpose of causing the levitated magnet arrangement to move in the direction of the base magnets which are being lowered; or raising one or more base magnets which are located under a levitated object and beside a levitated magnet arrangement, for the purpose of pushing, slowing, stopping, or redirecting movement, or creating a torque to tilt or spin the orientation of the levitated magnet arrangement; or performing one or more of the raising or lowering steps described above, for the purpose of providing stability to the levitated object.

19. A method of levitation and levitated transport, using the system of claim 2, comprising the steps of:

raising one or more offset arrays of base magnets using the actuators, and detruding one or more offset arrays of levitated magnets using the actuators, the levitated offset arrays being configured to imitate one or more the base magnet offset arrays, and at least a portion of each magnet in the levitated offset array being dynamically situated directly over a base magnet offset array; and dynamically raising any detruded offset levitated magnets which are not currently situated directly above a base magnet offset array.

20. A method of levitation and levitated transport, using the system of claim 19, further comprising the steps of:

detruding one or more levitated magnets which are located beside a base magnet offset array, for the purpose of pushing the levitated object away from the base magnet arrangement using magnetic repulsive force; or detruding one or more levitated magnets which are located ahead or beside of a base magnet offset array, when the levitated object is laterally moving, for the purpose of slowing or stopping or redirecting the movement of the levitated object; or lifting one or more detruded levitated magnets which are located over one side of a base magnet offset array, for the purpose of causing the levitated object to move in the direction of the levitated magnets which are being lifted; or detruding one or more levitated magnets which are located above and beside a base magnet offset array, for the purpose of pushing, slowing, stopping, or redirecting movement, or creating a torque to tilt or spin the orientation of the levitated object;

performing one or more of the detruding or lifting steps described above, for the purpose of providing stability to the levitated object.

21. A method of levitation and levitated transport, using the system of claim 2, comprising the steps of:

detruding one or more offset array of levitated magnets using the actuators, the offset arrays being configured to imitate one more or sub-arrangements of base magnets, and at least a portion of each magnet in the levitated offset array being dynamically situated directly over a base magnet sub-arrangement; and raising one or more base magnets under the levitated enlarged footprint, using the actuators, for the purpose of pushing, slowing, stopping, redirecting, or creating a torque to the levitated object; and adjusting the actuations of detruding levitated magnets to provide stability to the levitated object.

22. A levitation and levitated transport system, comprising:

a z-axis, defined to be parallel to a vector of the force of gravity;

an arrangement of base magnets, wherein:

the base magnets comprise permanent magnets;

each base magnet has a magnetization vector, and the magnetization vector of one or more of the base magnets contains a non-zero component in the Z-axis;

one or more of the base magnets is configured to be attached to a linear actuator with an actuation distance and an actuation direction, which actuator is configured to lift the base magnet or magnets up in the actuation direction;

the actuation direction contains a non-zero component in the z-axis; and each base magnet is separated laterally from its adjacent nearest neighbor magnets; and one or more arrangements of one or more levitated magnets, wherein:

the levitated magnets comprise permanent magnets;

each levitated magnet is attached to the underside of a levitated object;

each levitated magnet has a magnetization vector, and the magnetization vector of one or more of the levitated magnets contains a non-zero component in the z-axis, and the sign of the z component of the magnetization vector of the levitated magnet is opposite to the sign of the z component of the magnetization vector of one or more of the base magnets, so that the result of an interaction between the one or more base magnets and the one or more levitated magnets is net repulsion;

the one or more arrangements of one or more levitated magnets has a footprint, which is defined as the combined lateral area and pattern occupied by all of the levitated magnets; and an enlarged footprint is defined as the shape and size of the footprint, plus an expanded area around the perimeter of the footprint, appropriately shaped and sized to include one hypothetical additional lateral layer of levitated magnets;

further comprising a gyroscope incorporated into the levitated object.

23. A levitation and levitated transport system, comprising:

a z-axis, defined to be parallel to the vector of the force of gravity; and a base arrangement of permanent magnets, wherein:

each the base magnet has a magnetization vector, and the magnetization vector of one or more of the base magnets contains a non-zero component in the z-axis; and each the base magnet is separated laterally from its adjacent nearest neighbor magnets; and one or more levitated arrangements of one or more permanent magnets, wherein:

each the levitated magnet is attached underneath a levitated object; and each the levitated magnet has a magnetization vector, and the magnetization vector of one or more of the levitated magnets contains a non-zero component in the z-axis, and the sign of the z component of the magnetization vector of the levitated magnet is opposite to the sign of the z component of the magnetization vector of one or more of the base magnets, so that the result of an interaction between the one or more base magnets and the one or more levitated magnets is net repulsion; and each the levitated magnet is configured to be attached to a linear actuator with an actuation distance, underneath the levitated object, which actuator is configured to detrude the levitated magnet from a highest level downwards in an actuation direction which contains a non-zero component in the z-axis; and the levitated arrangement of permanent magnets has a footprint, which is defined as the combined lateral area and pattern occupied by all of the levitated magnets.

24. A method of levitation and levitated transport, using the system of claim 1, comprising the step of:

raising one or more offset arrays of base magnets using the actuators, the offset arrays being configured to apply repulsive forces to magnets in a levitated magnet arrangement situated above the offset array, such that the repulsive forces are sufficient to levitate the levitated object.

* * * * *